US011496256B2

(12) United States Patent
Tang et al.

(10) Patent No.: US 11,496,256 B2
(45) Date of Patent: Nov. 8, 2022

(54) COMMUNICATION METHOD AND APPARATUS

(71) Applicant: Huawei Technologies Co., Ltd., Shenzhen (CN)

(72) Inventors: Xun Tang, Beijing (CN); Li Chai, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/990,681

(22) Filed: Aug. 11, 2020

(65) Prior Publication Data

US 2020/0374061 A1 Nov. 26, 2020

Related U.S. Application Data

(63) Continuation of application No. PCT/CN2018/076677, filed on Feb. 13, 2018.

(51) Int. Cl.
*H04W 56/00* (2009.01)
*H04L 5/00* (2006.01)
*H04W 76/27* (2018.01)
*H04W 72/04* (2009.01)

(52) U.S. Cl.
CPC .......... *H04L 5/0032* (2013.01); *H04L 5/0057* (2013.01); *H04W 72/0446* (2013.01); *H04W 76/27* (2018.02)

(58) Field of Classification Search
CPC .... H04L 5/0032; H04L 5/0057; H04W 76/27; H04W 72/0446

USPC .......................................................... 370/336
See application file for complete search history.

(56) References Cited

U.S. PATENT DOCUMENTS

| 2010/0267378 | A1 | 10/2010 | Hamabe et al. |
| 2014/0029514 | A1 | 1/2014 | Yu et al. |
| 2015/0029955 | A1* | 1/2015 | Heo .................. H04W 72/0413 370/329 |
| 2015/0117284 | A1 | 4/2015 | Baldemair et al. |
| 2017/0156176 | A1* | 6/2017 | Bergquist ................ H04W 8/22 |

(Continued)

FOREIGN PATENT DOCUMENTS

| CN | 101605352 A | 12/2009 |
| CN | 101790200 A | 7/2010 |

(Continued)

OTHER PUBLICATIONS

LG Electronics Inc., "Idle measurement enhancement using UE speed", 3GPP TSG-RAN WG2 Meeting NR AH#2, R2-1706933, Tsingdao, China, Jun. 27-29, 2017, 3 pages.

(Continued)

*Primary Examiner* — Sai Ming Chan
(74) *Attorney, Agent, or Firm* — Slater Matsil, LLP

(57) ABSTRACT

A communication method and apparatus are provided. The method is: receiving a radio resource control RRC connection reconfiguration message sent by a network device, where the RRC connection reconfiguration message includes one or more secondary cells configured by the network device for a terminal, information used to indicate to activate the one or more secondary cells, and a start moment at which the terminal reports channel state information CSI; and starting to report the CSI of the one or more secondary cells at the start moment.

20 Claims, 12 Drawing Sheets

(56) References Cited

U.S. PATENT DOCUMENTS

| | | | |
|---|---|---|---|
| 2017/0339714 A1 | 11/2017 | Harada et al. | |
| 2018/0288755 A1* | 10/2018 | Liu | H04L 5/005 |
| 2018/0332659 A1 | 11/2018 | Hwang et al. | |
| 2020/0336227 A1* | 10/2020 | Takeda | H04L 5/005 |

FOREIGN PATENT DOCUMENTS

| | | | |
|---|---|---|---|
| CN | 103581918 A | 2/2014 | |
| CN | 104144437 A | 11/2014 | |
| CN | 104811929 A | 7/2015 | |
| CN | 106160980 A | 11/2016 | |
| CN | 107040956 A | 8/2017 | |
| CN | 107148791 A | 9/2017 | |
| CN | 107426764 A | 12/2017 | |
| CN | 107534538 A | 1/2018 | |
| WO | 2016149167 A1 | 9/2016 | |
| WO | 2017034230 A1 | 3/2017 | |
| WO | 2017041274 A1 | 3/2017 | |
| WO | 2019056906 A1 | 3/2019 | |

OTHER PUBLICATIONS

Nokia et al., "Direct activation of configured Scells", 3GPP TSG-RAN WG2 #99bis, R2-1713164, Reno, Nevada, USA, Nov. 27-Dec. 1, 2017, 6 pages.

3rd Generation Partnership Project, Technical Specification Group Radio Access Network, Evolved Universal Terrestrial Radio Access (E-UTRA), Medium Access Control (MAC) protocol specification (Release 15), 3GPP TS 36.321 V15.0.0 (Dec. 2017), 109 pages.

3rd Generation Partnership Project, Technical Specification Group Radio Access Network, Evolved Universal Terrestrial Radio Access (E-UTRA), Radio Resource Control (RRC), Protocol specification (Release 15), 3GPP TS 36.331 V15.0.1 (Jan. 2018), 776 pages.

Ericsson, "Measurement configurations and signaling for fast setup", 3GPP TSG-RAN WG2 NR#2 Tdoc R2-1707237, Qingdao, China, Jun. 27-29, 2017, 3 pages.

* cited by examiner

| $C_{7,0}$ | $C_{6,0}$ | $C_{5,0}$ | $C_{4,0}$ | $C_{3,0}$ | $C_{2,0}$ | $C_{1,0}$ | E | Oct 1 |
|---|---|---|---|---|---|---|---|---|
| $C_{7,1}$ | $C_{6,1}$ | $C_{5,1}$ | $C_{4,1}$ | $C_{3,0}$ | $C_{2,1}$ | $C_{1,1}$ | R | Oct 2 |

FIG. 7d

| $C_{7,0}$ | $C_{6,0}$ | $C_{5,0}$ | $C_{4,0}$ | $C_{3,0}$ | $C_{2,0}$ | $C_{1,0}$ | E' | Oct 1 |
|---|---|---|---|---|---|---|---|---|
| $C_{15,0}$ | $C_{14,0}$ | $C_{13,0}$ | $C_{12,0}$ | $C_{11,0}$ | $C_{10,0}$ | $C_{9,0}$ | $C_{8,0}$ | Oct 2 |
| $C_{23,0}$ | $C_{22,0}$ | $C_{21,0}$ | $C_{20,0}$ | $C_{19,0}$ | $C_{18,0}$ | $C_{17,0}$ | $C_{16,0}$ | Oct 3 |
| $C_{31,0}$ | $C_{30,0}$ | $C_{29,0}$ | $C_{28,0}$ | $C_{27,0}$ | $C_{26,0}$ | $C_{25,0}$ | $C_{24,0}$ | Oct 4 |

| $C_{7,1}$ | $C_{6,1}$ | $C_{5,1}$ | $C_{4,1}$ | $C_{3,1}$ | $C_{2,1}$ | $C_{1,1}$ | R' | Oct 1 |
|---|---|---|---|---|---|---|---|---|
| $C_{15,1}$ | $C_{14,1}$ | $C_{13,1}$ | $C_{12,1}$ | $C_{11,1}$ | $C_{10,1}$ | $C_{9,1}$ | $C_{8,1}$ | Oct 2 |
| $C_{23,1}$ | $C_{22,1}$ | $C_{21,1}$ | $C_{20,1}$ | $C_{19,1}$ | $C_{18,1}$ | $C_{17,1}$ | $C_{16,1}$ | Oct 3 |
| $C_{31,1}$ | $C_{30,1}$ | $C_{29,1}$ | $C_{28,1}$ | $C_{27,1}$ | $C_{26,1}$ | $C_{25,1}$ | $C_{24,1}$ | Oct 4 |

FIG. 7e

COMMUNICATION METHOD AND APPARATUS

CROSS-REFERENCE TO RELATED APPLICATIONS

This application is a continuation of International Application No. PCT/CN2018/076677, filed on Feb. 13, 2018, the disclosure of which is hereby incorporated by reference in its entirety.

TECHNICAL FIELD

Embodiments of this application relate to the field of communications technologies, and in particular, to a communication method and apparatus.

BACKGROUND

In a conventional cellular wireless communications system, a terminal can perform data receiving and sending in only one cell at a same moment. To provide a higher transmission rate for a terminal, a carrier aggregation (CA) technology is introduced into the wireless communications system. The CA technology enables a terminal to simultaneously transmit data on a plurality of carriers, thereby improving a data transmission rate. The plurality of carriers usually include one primary component carrier and one or more secondary component carriers. A cell working on the primary component carrier is a primary cell (PCell). The PCell is a cell that the terminal initially accesses, and a base station that serves the PCell is responsible for performing radio resource control (RRC) communication with the terminal. A cell operating on the secondary component carrier is a secondary cell (SCell). The SCell may provide an additional radio resource for the terminal.

The base station performs measurement configuration on the terminal on the primary component carrier, and the terminal measures another component carrier based on information about the measurement configuration. After completing the measurement, the terminal feeds back a measurement report to the base station. After receiving the measurement report, the base station sends an RRC connection reconfiguration message to the terminal, and configures a secondary cell for the terminal by using the RRC connection reconfiguration message. An initial state of the secondary cell configured by the base station for the terminal is usually a deactivated state. Then, the base station sends an activation command to the terminal, and the terminal completes activation of the secondary cell according to the activation command. After the activation of the secondary cell is completed, the base station and the terminal may transmit data through the secondary cell in the activated state.

It can be learned that a process of activating the secondary cell requires a long time. Consequently, efficiency of transmitting data using the carrier aggregation technology is reduced.

SUMMARY

An embodiment of this application provides a communication method and apparatus, to enhance application performance of a carrier aggregation technology.

Specific technical solutions provided in the embodiments of this application are as follows.

According to a first aspect, a communication method is provided. The method includes the following steps: receiving, by a terminal, an RRC connection reconfiguration message sent by a network device, where the RRC connection reconfiguration message includes one or more secondary cells configured by the network device for the terminal, information used to indicate to activate the one or more secondary cells, and a start moment at which the terminal reports channel state information (CSI); and starting, by the terminal, to report the CSI of the one or more secondary cells at the start moment. The information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the start moment at which CSI reporting is started is added to the RRC connection reconfiguration message, to help implement time synchronization between the terminal and the network device in a process of activating the secondary cell. Before the start moment arrives, because the terminal does not report the CSI, the network device may not schedule the terminal, that is, may not send the PDCCH, and the terminal does not need to listen to the PDCCH. In this way, a waste of uplink PUCCH resources can be avoided, and energy overheads for listening to the PDCCH by the terminal can be reduced.

In a possible design, the channel state information (CSI) may include at least one of the following indication information: a channel quality indicator (CQI), a feedback precoding matrix indicator (PMI), a rank indication (RI), and a precoding type indicator (PTI).

In a possible design, the method includes: periodically reporting, by the terminal, the CSI of the one or more secondary cells at a first periodicity; and receiving notification information sent by the network device, and periodically reporting the CSI of the one or more secondary cells based on the notification information at a second periodicity, where the first periodicity is less than the second periodicity. Periodic reporting is first performed at the relatively short first periodicity. This helps the network device quickly perform data transmission scheduling on the terminal. Switching between reporting at a short periodicity and reporting at a long periodicity is implemented based on the notification information. This manner is flexible and the network device can flexibly control a switching time point.

In a possible design, the method includes: starting a timer at the start moment, and periodically reporting the channel state information (CSI) of the one or more secondary cells at a first periodicity; and periodically reporting the CSI of the one or more secondary cells at a second periodicity after the timer expires, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced.

According to a second aspect, a communication method is provided. Steps of the communication method include: receiving, by a terminal, activation information sent by a network device, where the activation information is used to indicate to activate one or more secondary cells configured by the network device for the terminal; starting a timer based on the activation information, and periodically reporting channel state information (CSI) of the one or more secondary cells at a first periodicity; and periodically reporting the CSI of the one or more secondary cells at a second periodicity after the timer expires, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced.

In a possible design, the channel state information (CSI) includes at least one of the following: a channel quality indicator (CQI), a feedback precoding matrix indicator (PMI), a rank indication (RI), and a precoding type indicator (PTI).

According to a third aspect, a communication method is provided. Steps of the communication method include: receiving an activation command sent by a network device, where the activation command includes n first bits and one second bit, and the n first bits are used to indicate statuses of n secondary serving cells, and determining statuses of one or more secondary cells according to the activation command, where one first bit is used to indicate a status of one secondary cell, and when a value of the second bit is a first value, the first bit is used to indicate that the status of the secondary cell corresponding to the first bit is an activated state or a deactivated state; when a value of the second bit is a second value, the first bit is used to indicate whether the status of the secondary cell is a fast activated state; or one first bit is used to indicate a status of one secondary cell, and when a value of the second bit is a first value, the first bit is used to indicate that the status of the secondary cell corresponding to the first bit is an activated state or a deactivated state; when a value of the second bit is a second value, the first bit is used to indicate that the status of the secondary cell corresponding to the first bit is an activated state or a fast activated state; or when a value of the second bit is a first value, one first bit is used to indicate a status of one secondary cell, and the first bit is used to indicate that the status of the secondary cell corresponding to the first bit is an activated state or a deactivated state; when a value of the second bit is a second value, two first bits are used to indicate a status of one secondary cell, and the two first bits are used to indicate that the status of the secondary cell corresponding to the two first bits is an activated state, a deactivated state, or a fast activated state. Based on an existing MAC CE, three states of the secondary cell are indicated by reusing a reserved bit. This saves occupation of a new logical channel ID (LCID).

In a possible design, the method includes: starting a timer based on the activation command, and periodically reporting CSI of the one or more secondary cells at a first periodicity; and periodically reporting the CSI of the one or more secondary cells at a second periodicity after the timer expires, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced.

In a possible design, the channel state information (CSI) includes at least one of the following: a channel quality indicator (CQI), a feedback precoding matrix indicator (PMI), a rank indication (RI), and a precoding type indicator (PTI).

According to a fourth aspect, a communication method is provided. Steps of the communication method include: receiving, by a terminal, activation information sent by a network device, where the activation information is used to indicate to activate one or more secondary cells configured by the network device for the terminal; periodically reporting, by the terminal, channel state information (CSI) of the one or more secondary cells based on the activation information at a first periodicity; and receiving notification information sent by the network device, and periodically reporting the CSI of the one or more secondary cells based on the notification information at a second periodicity, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the notification information. This manner is flexible and the network device can flexibly control a switching time point.

In a possible design, the notification information includes: a radio resource control RRC message, a media access control layer control element (MAC CE), or a physical layer pilot signal.

In a possible design, the channel state information (CSI) includes at least one of the following: a channel quality indicator (CQI), a feedback precoding matrix indicator (PMI), a rank indication (RI), and a precoding type indicator (PTI).

According to a fifth aspect, a communication method is provided. The communication method is implemented by using the following steps: receiving, by a terminal, an RRC connection reconfiguration message sent by a network device, where the RRC connection reconfiguration message includes one or more secondary cells configured by the network device for the terminal, and information used to indicate to activate the one or more secondary cells, sending, by the terminal, a first acknowledgment message to the network device, where the first acknowledgment message is used to indicate that the RRC connection reconfiguration message is successfully received, or used to indicate that the secondary cell is successfully configured, or used to indicate that the secondary cell is successfully activated, and reporting channel state information (CSI) of the one or more secondary cells after first duration; or sending an RRC connection reconfiguration complete message to the network device, receiving a second acknowledgment message sent by the network device, where the second acknowledgment message is used to indicate that the RRC connection reconfiguration complete message is successfully received, and reporting CSI of the one or more secondary cells after second duration. The information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the first duration or the second duration is agreed on, to help implement time synchronization between the terminal and the network device in a process of activating the secondary cell. Before the first duration or the second duration arrives, because the terminal does not report the CSI, the network device may not schedule the terminal, that is, may not send a PDCCH, and the terminal does not need to listen to the PDCCH. In this way, a waste of uplink PUCCH resources can be avoided, and energy overheads for listening to the PDCCH by the terminal can be reduced.

The first duration or the second duration is pre-agreed on or notified by the network device. The manner of predefining the duration reduces signaling overheads, and the manner of notifying the duration by the network device can more flexibly indicate different delay times to the terminal.

In a possible design, the terminal may send the first acknowledgment message to the network device on different resources. For example, the terminal sends ACK information to the network device on a resource that is occupied by the ACK information and that is in a dedicated physical uplink control channel (PUCCH) resource, where the ACK information is used to indicate that the RRC connection reconfiguration message is successfully received or used to indicate that the secondary cell is successfully configured. Alternatively, the terminal sends the first acknowledgment message to the network device on a resource that is occupied by a demodulation reference signal (DMRS) and that is in a dedicated physical uplink shared channel (PUSCH) resource. Alternatively, the terminal sends the first acknowledgment message to the network device on a dedicated sounding reference signal (SRS) resource. Alternatively, the terminal sends the first acknowledgment message to the network device on a dedicated physical random access channel (PRACH) resource. Alternatively, the terminal sends a media access control layer control element (MAC CE) to the network device on an uplink resource indicated by the network device in the RRC connection reconfiguration message, where the MAC CE is used to indicate that the RRC connection reconfiguration message is successfully received, or used to indicate that the secondary cell is successfully configured, or used to indicate that the secondary cell is successfully activated. The first acknowledgment message is sent on the foregoing dedicated resource. In this way, that the RRC connection reconfiguration message is successfully received can be quickly fed back to the network device. This helps quickly implement time synchronization between the terminal and the network device in a process of activating the secondary cell.

In a possible design, the terminal may receive, in any one of the following manners, the second acknowledgment message sent by the network device. For example, the terminal receives ACK information on a dedicated physical hybrid automatic repeat request (HARQ) indicator channel (PHICH) resource, where the ACK information is used to indicate that the network device successfully receives the RRC reconfiguration complete message. Alternatively, the terminal receives the second acknowledgment message on a resource that is occupied by a demodulation reference signal (DMRS) and that is in a dedicated physical downlink shared channel (PDSCH) resource. Alternatively, the terminal receives a MAC CE on a downlink PDSCH resource, where the MAC CE is used to indicate that the network device successfully receives the RRC reconfiguration complete message. The network device sends the second acknowledgment message on the foregoing dedicated resource. In this way, the network device can quickly feed back that the RRC connection reconfiguration complete message is successfully received to the terminal. This helps quickly implement time synchronization between the terminal and the network device in a process of activating the secondary cell.

In a possible design, the method includes: periodically reporting, by the terminal, the CSI of the one or more secondary cells after the first duration at a first periodicity; and receiving notification information sent by the network device, and periodically reporting the CSI of the one or more secondary cells based on the notification information at a second periodicity, where the first periodicity is less than the second periodicity; or starting a timer after the first duration, and periodically reporting the CSI of the one or more secondary cells at a first periodicity; and after the timer expires, periodically reporting the CSI of the one or more secondary cells at a second periodicity, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced. Switching between reporting at a short periodicity and reporting at a long periodicity is implemented based on the notification information. This manner is flexible and the network device can flexibly control a switching time point.

In a possible design, the method includes: periodically reporting, by the terminal, the CSI of the one or more secondary cells after the second duration at a first periodicity; and receiving notification information sent by the network device, and periodically reporting the CSI of the one or more secondary cells based on the notification information at a second periodicity, where the first periodicity is less than the second periodicity; or starting a timer after the second duration, and periodically reporting the CSI of the one or more secondary cells at a first periodicity; and after the timer expires, periodically reporting the CSI of the one or more secondary cells at a second periodicity, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced. Switching between reporting at a short periodicity and reporting at a long periodicity is implemented based on the notification information. This manner is flexible and the network device can flexibly control a switching time point.

In a possible design, the channel state information (CSI) includes at least one of the following: a channel quality indicator (CQI), a feedback precoding matrix indicator (PMI), a rank indication (RI), and a precoding type indicator (PTI).

According to a sixth aspect, a communication method is provided. The method is implemented by using the following steps: sending, by a network device, a radio resource control (RRC) connection reconfiguration message to a terminal, where the RRC connection reconfiguration message includes one or more secondary cells configured by the network device for the terminal, information used to indicate to activate the one or more secondary cells, and a start moment at which the terminal reports channel state information (CSI); and receiving, by the network device based on the start moment, the channel state information (CSI) of the one or more secondary cells that is reported by the terminal. The information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the start moment at which CSI reporting is started is added to the RRC connection reconfiguration message, to help implement time synchronization between the terminal and the network device in a process of activating the secondary cell. Before the start moment arrives, because the terminal does not report the CSI, the network device may not schedule the terminal, that is, may not send the PDCCH, and the terminal does not need to listen to the PDCCH. In this way, a waste of uplink PUCCH resources can be avoided, and energy overheads for listening to the PDCCH by the terminal can be reduced.

In a possible design, the channel state information (CSI) includes at least one of the following: a channel quality indicator (CQI), a feedback precoding matrix indicator (PMI), a rank indication (RI), and a precoding type indicator (PTI).

In a possible design, the method includes: receiving, by the network device based on the start moment, the CSI of the one or more secondary cells that is periodically reported at a first periodicity from the terminal; and sending, by the network device, notification information to the terminal, where the notification information is used to indicate the terminal to periodically report the CSI of the one or more secondary cells at a second periodicity, where the first periodicity is less than the second periodicity. Periodic reporting is first performed at the relatively short first periodicity. This helps the network device quickly perform data transmission scheduling on the terminal. Switching between reporting at a short periodicity and reporting at a long periodicity is implemented based on the notification information. This manner is flexible and the network device can flexibly control a switching time point.

In a possible design, the notification information includes: a radio resource control RRC message, a media access control layer control element (MAC CE), or a physical layer pilot signal.

According to a seventh aspect, a communication method is provided. Steps of the communication method include: sending, by a network device, an activation command to a terminal, where the activation command includes n first bits and one second bit, where one first bit is used to indicate a status of one secondary cell, and when a value of the second bit is a first value, the first bit is used to indicate that the status of the secondary cell corresponding to the first bit is an activated state or a deactivated state; when a value of the second bit is a second value, the first bit is used to indicate whether the status of the secondary cell is a fast activated state; or one first bit is used to indicate a status of one secondary cell, and when a value of the second bit is a first value, the first bit is used to indicate that the status of the secondary cell corresponding to the first bit is an activated state or a deactivated state; when a value of the second bit is a second value, the first bit is used to indicate that the status of the secondary cell corresponding to the first bit is an activated state or a fast activated state; or when a value of the second bit is a first value, one first bit is used to indicate a status of one secondary cell, and the first bit is used to indicate that the status of the secondary cell corresponding to the first bit is an activated state or a deactivated state; when a value of the second bit is a second value, two first bits are used to indicate a status of one secondary cell, and the two first bits are used to indicate that the status of the secondary cell corresponding to the two first bits is an activated state, a deactivated state, or a fast activated state. Based on an existing MAC CE, three states of the secondary cell are indicated by reusing a reserved bit. This saves occupation of a new logical channel ID (LCID).

In a possible design, the method includes: receiving, by the network device, CSI of the secondary cells that is periodically reported at a first periodicity from the terminal; and sending notification information to the terminal, where the notification information is used to indicate the terminal to periodically report the CSI of the one or more secondary cells at a second periodicity, where the first periodicity is less than the second periodicity. The terminal first performs periodic reporting at the relatively short first periodicity. This helps the network device quickly perform data transmission scheduling on the terminal. Switching between reporting at a short periodicity and reporting at a long periodicity is implemented based on the notification information. This manner is flexible and the network device can flexibly control a switching time point.

In a possible design, the notification information includes: a radio resource control RRC message, a media access control layer control element (MAC CE), or a physical layer pilot signal.

In a possible design, the CSI includes at least one of the following: a channel quality indicator CQI, a feedback precoding matrix indicator (PMI), a rank indication (RI), and a precoding type indicator (PTI).

According to an eighth aspect, a communication method is provided. Steps of the communication method include: sending, by a network device, activation information to a terminal, where the activation information is used to indicate the terminal to activate one or more secondary cells; receiving, by the network device, CSI of the one or more secondary cells that is periodically reported at a first periodicity from the terminal; and sending notification information to the terminal, where the notification information is used to indicate the terminal to periodically report the CSI of the one or more secondary cells at a second periodicity, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the notification information. This manner is flexible and the network device can flexibly control a switching time point.

In a possible design, the notification information includes: a radio resource control RRC message, a media access control layer control element (MAC CE), or a physical layer pilot signal.

In a possible design, the channel state information (CSI) includes at least one of the following: a channel quality indicator (CQI), a feedback precoding matrix indicator (PMI), a rank indication (RI), and a precoding type indicator (PTI).

According to a ninth aspect, a communication method is provided. The method is implemented by using the following steps: sending, by a network device, an RRC connection reconfiguration message to a terminal, where the RRC connection reconfiguration message includes one or more secondary cells configured by the network device for the terminal, and information used to indicate to activate the one or more secondary cells, receiving, by the network device, a first acknowledgment message sent by the terminal, where the first acknowledgment message is used to indicate that the RRC connection reconfiguration message is successfully received, or used to indicate that the secondary cell is successfully configured, or used to indicate that the secondary cell is successfully activated, and receiving, after first duration, channel state information (CSI) of the one or more secondary cells that is reported by the terminal; or receiving an RRC connection reconfiguration complete message sent by the terminal, sending a second acknowledgment message to the terminal, where the second acknowledgment message is used to indicate that the RRC connection reconfiguration complete message is successfully received, and receiving, after second duration, CSI of the one or more secondary cells that is reported by the terminal. The information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the first duration or the second duration is agreed on, to help implement time synchronization between the terminal and the network device in a process of activating the secondary cell. Before the first duration or the second duration arrives, because the terminal does not report the CSI, the network device may not schedule the terminal, that is, may not send a PDCCH, and the terminal does not need to listen to the PDCCH. In this way, a waste of uplink PUCCH resources can be avoided, and energy overheads for listening to the PDCCH by the terminal can be reduced.

In a possible design, the network device notifies the terminal of the first duration or the second duration, or the first duration or the second duration is pre-agreed on. The manner of predefining the duration reduces signaling overheads, and the manner of notifying the duration by the network device can more flexibly indicate different delay times to the terminal.

In a possible design, the network device receives, in any one of the following manners, the first acknowledgment message sent by the terminal. For example, the network device receives, ACK information sent by the terminal, on a resource that is occupied by the ACK information and that is in a dedicated physical uplink control channel (PUCCH) resource, where the ACK information is used to indicate that the RRC connection reconfiguration message is successfully received or used to indicate that the secondary cell is successfully configured. Alternatively, the network device receives, the first acknowledgment message sent by the terminal, on a resource that is occupied by a demodulation reference signal (DMRS) and that is in a dedicated physical uplink shared channel (PUSCH) resource. Alternatively, the network device receives, the first acknowledgment message sent by the terminal, on a dedicated sounding reference signal (SRS) resource. Alternatively, the network device receives, the first acknowledgment message sent by the terminal, on a dedicated physical random access channel (PRACH) resource. Alternatively, the network device receives, a media access control layer control element MAC CE sent by the terminal, on an uplink resource indicated to the terminal in the RRC connection reconfiguration message, where the MAC CE is used to indicate that the RRC connection reconfiguration message is successfully received, or used to indicate that the secondary cell is successfully configured, or used to indicate that the secondary cell is successfully activated. The terminal sends the first acknowledgment message on the foregoing dedicated resource. In this way, the terminal can quickly feed back that the RRC connection reconfiguration message is successfully received to the network device. This helps quickly implement time synchronization between the terminal and the network device in a process of activating the secondary cell.

In a possible design, the network device sends the second acknowledgment message to the terminal in the following manners. For example, the network device sends ACK information to the terminal on a dedicated physical hybrid automatic repeat request (HARQ) indicator channel (PHICH) resource, where the ACK information is used to indicate that the RRC reconfiguration complete message is successfully received. Alternatively, the network device sends the second acknowledgment message to the terminal on a resource that is occupied by a demodulation reference signal (DMRS) and that is in a dedicated physical downlink shared channel (PDSCH) resource. Alternatively, the network device sends a MAC CE to the terminal on a downlink PDSCH resource, where the MAC CE is used to indicate that the RRC reconfiguration complete message is successfully received. The network device sends the second acknowledgment message on the foregoing dedicated resource. In this way, the network device can quickly feed back that the RRC connection reconfiguration complete message is successfully received to the terminal. This helps quickly implement time synchronization between the terminal and the network device in a process of activating the secondary cell.

In a possible design, the method includes: receiving, by the network device, CSI of the one or more secondary cells that is periodically reported at a first periodicity from the terminal; and sending notification information to the terminal, where the notification information is used to indicate the terminal to periodically report the CSI of the one or more secondary cells at a second periodicity, where the first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced. Switching between reporting at a short periodicity and reporting at a long periodicity is implemented based on the notification information. This manner is flexible and the network device can flexibly control a switching time point.

In a possible design, the channel state information (CSI) includes at least one of the following: a channel quality indicator (CQI), a feedback precoding matrix indicator (PMI), a rank indication (RI), and a precoding type indicator (PTI).

According to a tenth aspect, a communications apparatus is provided. The apparatus has a function of implementing any one of the first aspect or the possible designs of the first aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the first aspect or the possible designs of the first aspect.

In a possible design, the apparatus further includes a transceiver, configured to perform communication between the apparatus and a network device.

In a possible design, the apparatus is a terminal.

According to an eleventh aspect, a communications apparatus is provided. The apparatus has a function of implementing any one of the second aspect or the possible designs of the second aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the second aspect or the possible designs of the second aspect.

In a possible design, the apparatus further includes a transceiver, configured to perform communication between the apparatus and a network device.

In a possible design, the apparatus is a terminal.

According to a twelfth aspect, a communications apparatus is provided. The apparatus has a function of implementing any one of the third aspect or the possible designs of the third aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the third aspect or the possible designs of the third aspect.

In a possible design, the apparatus further includes a transceiver, configured to perform communication between the apparatus and a network device.

In a possible design, the apparatus is a terminal.

According to a thirteenth aspect, a communications apparatus is provided. The apparatus has a function of implementing any one of the fourth aspect or the possible designs of the fourth aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the fourth aspect or the possible designs of the fourth aspect.

In a possible design, the apparatus further includes a transceiver, configured to perform communication between the apparatus and a network device.

In a possible design, the apparatus is a terminal.

According to a fourteenth aspect, a communications apparatus is provided. The apparatus has a function of implementing any one of the fifth aspect or the possible designs of the fifth aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the fifth aspect or the possible designs of the fifth aspect.

In a possible design, the apparatus further includes a transceiver, configured to perform communication between the apparatus and a network device.

In a possible design, the apparatus is a terminal.

According to a fifteenth aspect, a communications apparatus is provided. The apparatus has a function of implementing any one of the sixth aspect or the possible designs of the sixth aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the sixth aspect or the possible designs of the sixth aspect.

In a possible design, the apparatus further includes a transceiver, configured to perform communication between the apparatus and a network device.

In a possible design, the apparatus is a network device.

According to a sixteenth aspect, a communications apparatus is provided. The apparatus has a function of implementing any one of the seventh aspect or the possible designs of the seventh aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the seventh aspect or the possible designs of the seventh aspect.

In a possible design, the apparatus further includes a transceiver, configured to perform communication between the apparatus and a network device.

In a possible design, the apparatus is a network device.

According to a seventeenth aspect, a communications apparatus is provided. The apparatus has a function of implementing any one of the eighth aspect or the possible designs of the eighth aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the eighth aspect or the possible designs of the eighth aspect.

In a possible design, the apparatus further includes a transceiver, configured to perform communication between the apparatus and a network device.

In a possible design, the apparatus is a network device.

According to an eighteenth aspect, a communications apparatus is provided. The apparatus has a function of implementing any one of the ninth aspect or the possible designs of the ninth aspect. The function may be implemented by hardware, or may be implemented by executing corresponding software by hardware. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the ninth aspect or the possible designs of the ninth aspect.

In a possible design, the apparatus further includes a transceiver, configured to perform communication between the apparatus and a network device.

In a possible design, the apparatus is a network device.

According to a nineteenth aspect, a chip apparatus is provided. The chip apparatus is connected to a memory, or the chip apparatus includes a memory, and is configured to read and execute a software program stored in the memory, to implement the method according to any one of the foregoing aspects or the possible designs of the foregoing aspects.

According to a twentieth aspect, a communications system is provided. The communications system includes the apparatuses according to the tenth aspect to the fourteenth aspect, and further includes the apparatuses according to the fifteenth aspect to the eighteenth aspect.

According to a twenty-first aspect, a computer storage medium is provided, storing a computer program, where the computer program includes an instruction used to perform the method according to any one of the foregoing aspects or the possible designs of the foregoing aspects.

According to a twenty-second aspect, a computer program product including an instruction is provided, where when the computer program product runs on a computer, the computer is enabled to perform the method according to any one of the foregoing aspects or the possible designs of the foregoing aspects.

BRIEF DESCRIPTION OF THE DRAWINGS

FIG. 7d is a third schematic diagram of a data format of an activation command according to an embodiment of this application;

FIG. 7e is a fourth schematic diagram of a data format of an activation command according to an embodiment of this application;

DETAILED DESCRIPTION OF ILLUSTRATIVE EMBODIMENTS

Figure 1:
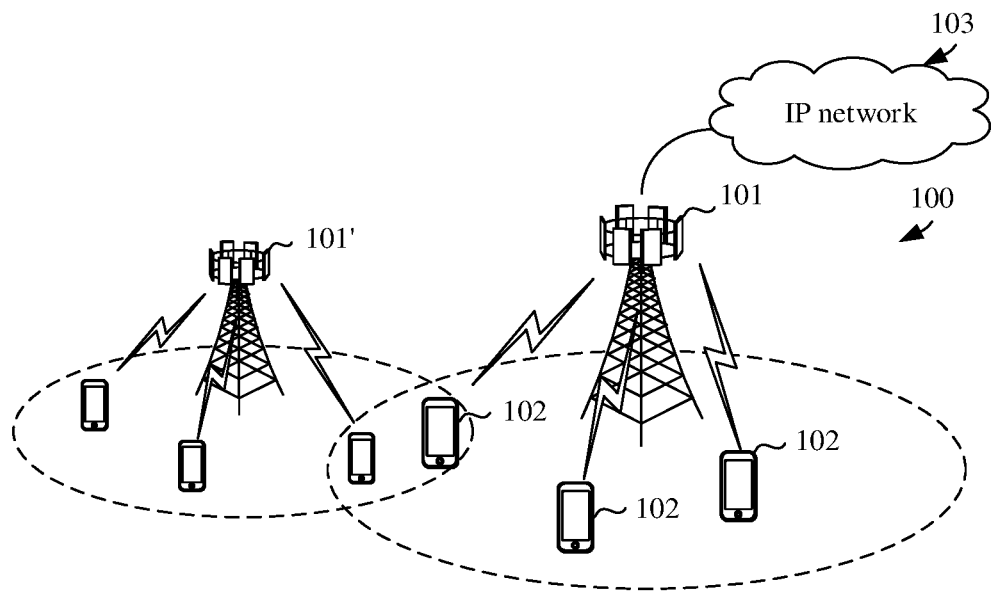
FIG. 1 is a schematic architecture diagram of a communications system according to an embodiment of this application.

This application provides a communication method and apparatus, to reduce a delay in activating a secondary cell, thereby improving utilization of a carrier aggregation technology and further improving data transmission efficiency of a system. The method and the device are based on a same inventive concept. Because problem resolving principles of the method and the device are similar, for implementation of the device and the method, refer to each other, and repeated parts are not described again.

Some terms and basic knowledge that is of carrier aggregation that are used in the embodiments of this application are first explained and described, to facilitate understanding of persons skilled in the art.

(1) Carrier Aggregation

Carrier aggregation ensures that a network device configures a plurality of carriers for one terminal, and both the terminal and a network device transmit data on the plurality of carriers. The plurality of carriers usually include one primary component carrier (PCC) and one or more secondary component carriers (SCC). A cell working on the primary component carrier is a primary cell (PCell). The PCell is a cell that the terminal initially accesses, and a base station that serves the PCell is responsible for performing radio resource control (RRC) communication with the terminal. A cell operating on the secondary component carrier is a secondary cell (SCell). The SCell may provide an additional radio resource for the terminal. The PCC is always activated, and the SCC may be activated by using the PCC or an activated SCC.

If the terminal exchanges data with the network device on the primary component carrier, the terminal exchanges data with the network device in the primary cell. If the terminal exchanges data with the network device on the secondary component carrier, the terminal exchanges data with the network device in the secondary cell.

(2) Activated State and Deactivated State of a Secondary Cell

A status of the secondary cell includes at least the activated state and the deactivated state. In a secondary cell in a deactivated state, a terminal does not send a sounding reference signal (SRS), does not send uplink (UL) data, does not send channel state information (CSI) of the secondary cell, does not listen to a physical downlink control channel (PDCCH) of the secondary cell, does not perform random access to the secondary cell, and does not transmit data on a physical uplink control (PUCCH) of the secondary cell. The CSI includes at least one of the following: a channel quality indicator (CQI), a precoding matrix indicator (PMI), a rank indication (RI), and a precoding type indicator (PTI).

After receiving an activation command, the terminal activates a secondary cell configured by a network device for the terminal, for example, starts a deactivation timer of the secondary cell. After completing downlink CSI measurement, the terminal feeds back CSI to the network device, indicating that the activation is completed. Then, the network device starts to perform data transmission with the terminal. In an activated secondary cell, the terminal may send an SRS, send UL data, send CSI of the secondary cell, listen to a PDCCH of the secondary cell, listen to a PDCCH related to the secondary cell (for example, perform listening in a primary cell), and perform power headroom reporting (PHR).

(3) A communication method provided in the following embodiments of this application relates to configuring or activating one or more secondary cells. A terminal measures one or more carriers notified by a network device, and reports a measurement result to the network device. The network device configures a secondary cell for the terminal. There may be one or more secondary cells. For ease of description, the one or more secondary cells are referred to as a secondary cell for short. An operation performed on the secondary cell is an operation performed on any one of the one or more secondary cells allocated to the terminal.

(4) The term "or" describes an association relationship for describing associated objects and represents that three relationships may exist. For example, A or B may represent the following three cases: Only A exists, both A and B exist, and only B exists. "A plurality of" refers to two or more than two. Words such as "first" and "second" are merely used for distinction and description, and shall not be understood as an indication or implication of relative importance or an indication or implication of an order. The character "/" generally indicates an "or" relationship between the associated objects.

Based on the foregoing description, the following describes in detail the communication method and apparatus provided in the embodiments of this application with reference to the accompanying drawings.

The following describes an architecture of a communications system applicable to the embodiments of this application.

Figure 3:
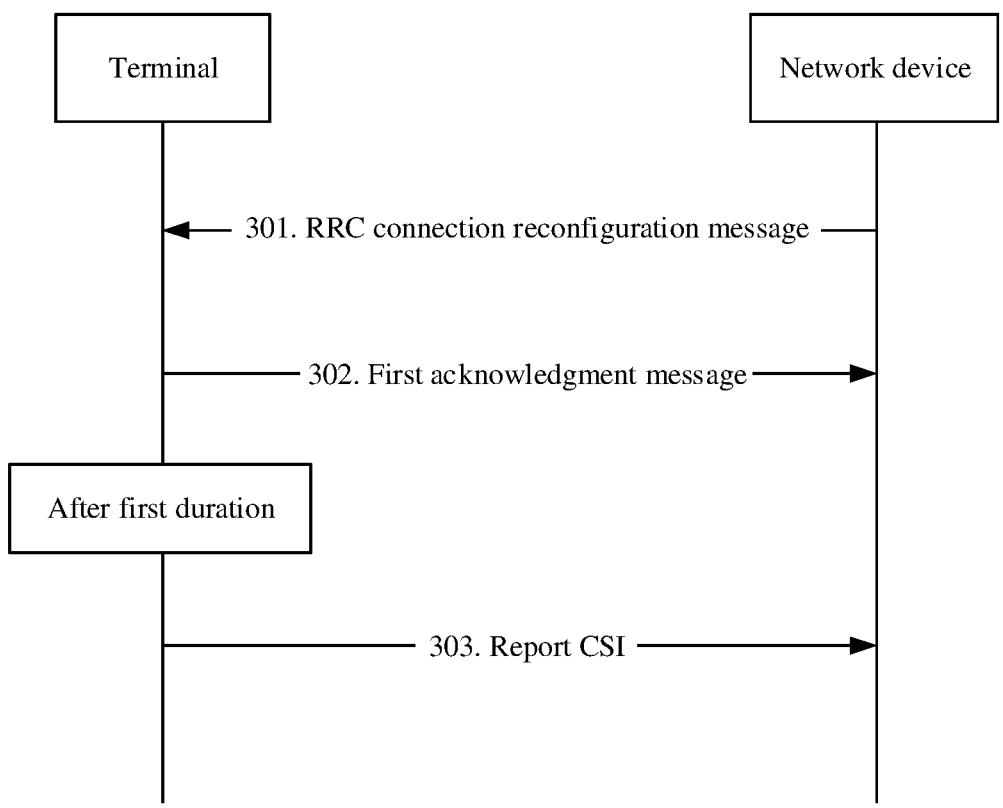
FIG. 3 is a schematic flowchart of a second communication method according to an embodiment of this application.

FIG. 1 shows an architecture of a possible communications system applicable to the communication method according to the embodiments of this application. As shown in FIG. 1, the communications system 100 includes a network device 101 and one or more terminals 102. When the communications system 100 includes a core network, the network device 101 may be further connected to the core network. The network device 101 may communicate with an IP network 103 through the core network. For example, the IP network 103 may be an Internet, a private IP network, another data network, or the like. The network device 101 provides a service for a terminal 102 within a coverage area of the network device 101. For example, as shown in FIG. 3, the network device 101 provides wireless access for one or more terminals 102 within the coverage area of the network device 101. The communications system 100 may include a plurality of network devices, for example, may further include a network device 101'. There may be an overlapping area between coverage areas of network devices. For example, there is an overlapping area between coverage areas of the network device 101 and the network device 101'. The network devices may further communicate with each other. For example, the network device 101 may communicate with the network device 101'.

The network device 101 is a device used for connecting the terminal 102 to a wireless network in a communications system to which this application is applied, and can configure a secondary cell for the terminal 102, and activate or deactivate the secondary cell. The network device 101 is a node in a radio access network (RAN), and may also be referred to as a base station, or may also be referred to as a RAN node (or a device). Currently, for example, the network device 101 is a gNB/NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB, a home Node B, HNB), a baseband unit (BBU), a wireless fidelity (Wifi) access point (AP), or a network side device in a 5G communications system or a possible future communications system.

The terminal 102 is also referred to as user equipment (UE), a mobile station (MS), a mobile terminal (MT), or the like, and is a device that provides voice or data connectivity for a user, or may be an internet of things device. For example, the terminal 102 includes a handheld device or a vehicle-mounted device that has a wireless connection function. Currently, the terminal 102 may be a mobile phone, a tablet, a notebook computer, a palmtop computer, a mobile internet device (MID), a wearable device (such as a smartwatch, a smart band, or a pedometer), a vehicle-mounted device (such as an automobile, a bicycle, an electric vehicle, an aircraft, a ship, a train, or a high-speed train), a virtual reality (VR) device, an augmented reality (AR) device, a wireless terminal in industrial control, a smart home device (such as a refrigerator, a television, an air conditioner, or an electricity meter), an intelligent robot, a workshop device, a wireless terminal in self-driving, a wireless terminal in remote surgery, a wireless terminal in a smart grid, a wireless terminal in transportation safety, a wireless terminal in a smart city, a wireless terminal in a smart home, a flight device (such as an intelligent robot, a hot balloon, an unmanned aerial vehicle, or an aircraft), or the like.

The terminal 102 supports a carrier aggregation technology, and is configured to: measure one or more carriers notified by the network device 101, report a measurement result, and receive a configuration for adding or modifying one or more secondary cells from the network device 101. The terminal 102 can perform data transmission with the network device 101 by using two or more carriers/cells.

The communications system shown in FIG. 1 may be a fourth generation (4G) communications system, a fifth generation (5G) communications system, or a future communications system.

Figure 2:
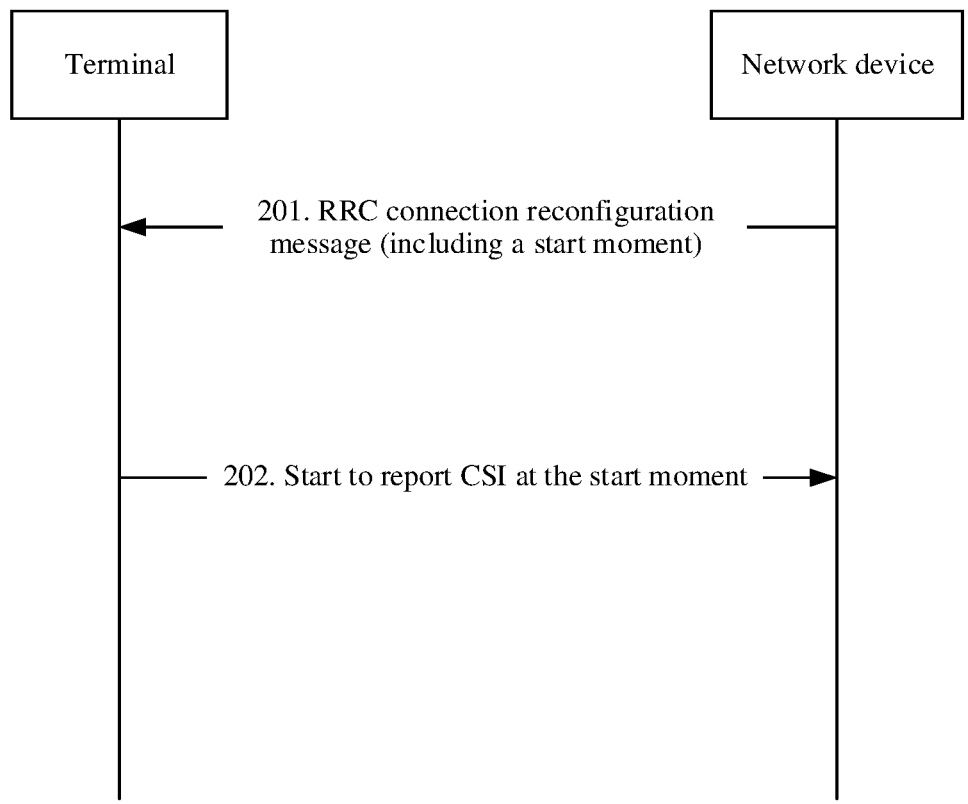
FIG. 2 is a schematic flowchart of a first communication method according to an embodiment of this application.

Based on the architecture of the communications system shown in FIG. 1, as shown in FIG. 2, the following describes in detail a first communication method according to an embodiment of this application.

Step 201. A network device sends a radio resource control (RRC) connection reconfiguration message to a terminal, and the terminal receives the RRC connection reconfiguration message sent by the network device.

The RRC connection reconfiguration message includes one or more secondary cells configured by the network device for the terminal, information used to indicate to activate the one or more secondary cells, and a start moment at which the terminal reports CSI. Optionally, the RRC connection reconfiguration message herein may be another type of RRC signaling that carries the foregoing several types of information.

Step 202. The terminal reports the CSI of the secondary cell when the start moment arrives, and the network device receives the CSI of the secondary cell that is reported by the terminal.

In another design of this application, the start moment in the foregoing step may be used to indicate any one or more behaviors of activation complete operations performed by the terminal. The activation complete operations are some operations needing to be performed by the terminal after an activation operation performed on the secondary cell ends, to complete activation of the secondary cell. The network device can schedule the terminal only after the activation complete operations are performed. The activation complete operations include reporting the CSI. For example, the start moment in the foregoing step may be used to indicate a start moment at which the terminal listens to a PDCCH, and the terminal starts to listen to the PDCCH when the start moment arrives.

The foregoing start moment is a definite time point, and may be embodied, for example, in a form of a combination of a frame number and a subframe number. The one or more secondary cells included in the RRC connection reconfiguration message and configured by the network device for the terminal may be secondary cells added or modified by the terminal based on a configuration from the network device.

In the first communication method provided in this embodiment of this application, the information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the start moment at which CSI reporting is started is added to the RRC connection reconfiguration message, to help implement time synchronization between the terminal and the network device in a process of activating the secondary cell. Before the start moment arrives, because the terminal does not report the CSI, the network device may not schedule the terminal, that is, may not send the PDCCH, and the terminal does not need to listen to the PDCCH. In this way, a waste of uplink PUCCH resources can be avoided, and energy overheads for listening to the PDCCH by the terminal can be reduced.

Based on the architecture of the communications system shown in FIG. 1, as shown in FIG. 3, the following describes in detail a second communication method according to an embodiment of this application.

Step 301. A network device sends an RRC connection reconfiguration message to a terminal, and the terminal receives the RRC connection reconfiguration message sent by the network device.

The RRC connection reconfiguration message includes one or more secondary cells configured by the network device for the terminal, and information used to indicate to activate the one or more secondary cells. Optionally, the RRC connection reconfiguration message herein may be another type of RRC signaling that carries the foregoing several types of information.

Step 302. The terminal sends a first acknowledgment message to the network device, and the network device receives the first acknowledgment message.

The first acknowledgment message is an acknowledgment message quickly fed back for the RRC connection reconfiguration message, and is used to indicate that the RRC connection reconfiguration message is successfully received, or used to indicate that the secondary cell is successfully configured to the network device, or used to indicate that the secondary cell is successfully activated to the network device.

Step 303. After sending the first acknowledgment message, the terminal reports CSI of the secondary cell after first duration, and the network device receives the CSI reported by the terminal.

The first duration is pre-agreed on or notified by the network device, and the first duration may be one or more frames, or the first duration may be one or more subframes. As an indication meaning of the first acknowledgment message varies, a length of the first duration changes accordingly. For example, the first acknowledgment message is used to indicate that the RRC connection reconfiguration message is successfully received, or used to indicate that the secondary cell is successfully configured to the network device, or used to indicate that the secondary cell is successfully activated to the network device. Lengths of the first duration corresponding to the three indication meanings decrease successively.

Optionally, the terminal starts to report the CSI of the secondary cell at a moment at which the terminal sends the first acknowledgment message.

The following specifically describes a manner in which the terminal sends the first acknowledgment message in step 302. Specifically, the terminal may quickly send the first acknowledgment message on an L1 resource or an L2 resource. The L1 resource is a layer 1 resource, and the L2 resource is a layer 2 resource.

First, the first acknowledgment message may be sent on the L1 resource in the following several manners.

Example 1: The first acknowledgment message may be ACK information. The terminal sends the ACK information to the network device on a resource that is occupied by the ACK information and that is in a physical uplink control channel (PUCCH) resource, where the ACK information is used to indicate that the RRC connection reconfiguration message is successfully received or used to indicate that the secondary cell is successfully configured. The PUCCH resource is a dedicated PUCCH resource notified by the network device, and a notification manner of the dedicated PUCCH resource may be a PUCCH resource index value. Alternatively, the PUCCH resource is a dedicated PUCCH resource specified in a protocol. For example, a specified manner may be a PUCCH resource index value.

The ACK information is sent on the dedicated PUCCH resource, to quickly feed back that the RRC connection reconfiguration message is successfully received. This helps implement time synchronization between the terminal and the network device in a process of activating the secondary cell.

Example 2: The terminal sends the first acknowledgment message to the network device on a resource that is occupied by a demodulation reference symbol (DMRS) and that is in a physical uplink shared channel (PUSCH) resource. The PUSCH resource is a dedicated PUSCH resource notified by the network device, or a dedicated PUSCH resource specified in a protocol. Indication information of the dedicated PUSCH resource includes at least one of a (resource block, RB) location, a demodulation reference signal (DMRS) cyclic shift value, and an orthogonal cover code (OCC) code.

Example 3: The terminal sends the first acknowledgment message to the network device on a sounding reference signal (SRS) resource. The SRS resource is a dedicated SRS resource notified by the network device, or a dedicated SRS resource specified in a protocol. Indication information of the dedicated SRS resource includes at least one of an RB location, an odd-numbered subcarrier or even-numbered subcarrier occupation indication, and a cyclic shift value.

Example 4: The terminal sends the first acknowledgment message to the network device on a dedicated physical random access channel (PRACH) resource. The PRACH resource is a dedicated PRACH resource notified by the network device, or a dedicated PRACH resource specified in a protocol. The dedicated PRACH resource may be a specific time-frequency resource location indication and a code resource indication.

Example 5: The terminal sends the first acknowledgment message to the network device on a dedicated uplink resource. The dedicated uplink resource may be a resource of a new physical channel different from an existing channel, and is used to carry acknowledgment information for the RRC connection reconfiguration message. The dedicated uplink resource is notified by the network device or specified in a protocol. The dedicated uplink resource may be a specific time-frequency resource location indication and a code resource indication.

Optionally, the L1 resource takes effect periodically. The base station indicates a periodicity value and an offset value in configuration information of the secondary cell, and the terminal calculates an effective-time location of the L1 resource based on the two values.

After the first acknowledgment message is sent in any one of the manners in the example 1 to the example 5, the CSI of the secondary cell starts to be reported after the first duration. For example, the first duration is 4 ms, that is, the first duration is four subframes. The terminal sends the first acknowledgment message at an $n^{th}$ moment, and starts to report the CSI of the secondary cell at an $(n+4)^{th}$ moment. A specific uplink resource used for reporting is determined based on a base station indication message.

The foregoing example 1 to example 5 show several possible manners in which the terminal sends the first acknowledgment message, and are merely examples for description. Certainly, the terminal may alternatively quickly feed back the first acknowledgment message in another manner. In addition, if the resources used by the terminal to send the first acknowledgment message in the foregoing example 1 to example 5 is notified by the network device, in an optional manner, the network device may notify the resources by using the RRC connection reconfiguration message, and the terminal obtains the resources used to send the first acknowledgment message from the RRC connection reconfiguration message. Certainly, the terminal can alternatively obtain the resources used to send the first acknowledgment message in advance through other messages, which is not specified in this application.

Second, the first acknowledgment message is sent on the L2 resource.

Before sending the first acknowledgment message, the terminal obtains an uplink resource, and sends uplink data on the obtained uplink resource, where the uplink data includes the first acknowledgment message. For example, the network device provides an uplink scheduling grant (UL-Grant) for the terminal in the RRC connection reconfiguration message, and the terminal sends the uplink data on the uplink resource indicated by the UL-Grant. The uplink data may include at least one of a media access control layer control element (MAC CE), user data, or a padding bit. The MAC CE is the first acknowledgment message, and the MAC CE is used to indicate that the RRC connection reconfiguration message is successfully received, or used to indicate that the secondary cell is successfully configured, or used to indicate that the secondary cell is successfully activated. Optionally, the UL-Grant is periodicity effective. After successfully receiving the RRC connection reconfiguration message, or completing secondary cell configuration, or activating the secondary cell, the terminal may send the uplink data on the uplink resource indicated by the UL-Grant. Before completing the foregoing actions, the terminal does not use the uplink resource to send information, and stops using the uplink resource to send information after the first acknowledgment message is successfully sent.

After sending the MAC CE, the terminal starts to report the CSI of the secondary cell after the first duration. In another possible design, after the terminal sends the MAC CE, the network device feeds back ACK information if successfully receiving the MAC CE. After receiving the ACK information that is used to indicate that the MAC CE is successfully received and that is fed back by the network device, the terminal starts to report the CSI of the secondary cell after the first duration. For example, the terminal starts to report the CSI of the secondary cell in a next subframe of a subframe in which the ACK information that is used to indicate that the MAC CE is successfully received and that is fed back by the network device is received.

In another possible design, the behavior of reporting the CSI may be replaced with any one or more behaviors of activation complete operations performed by the terminal, to constitute another solution that needs to be protected in this application. The activation complete operations are some operations needing to be performed by the terminal after an activation operation performed on the secondary cell ends, to complete activation of the secondary cell. The network device can schedule the terminal only after the activation complete operations are performed. The activation complete operations include reporting the CSI. For example, the foregoing behavior of reporting the CSI is replaced with a behavior of listening to a PDCCH by the terminal.

In the second communication method provided in this embodiment of this application, the information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the terminal quickly feeds back an acknowledgment message after receiving the RRC connection reconfiguration message, to help implement time synchronization between the terminal and the network device in a process of activating the secondary cell. Before the start moment arrives, because the terminal does not report the CSI, the network device may not schedule the terminal, that is, may not send the PDCCH, and the terminal does not need to listen to the PDCCH. In this way, a waste of uplink PUCCH resources can be avoided, and energy overheads for listening to the PDCCH by the terminal can be reduced.

Figure 4:
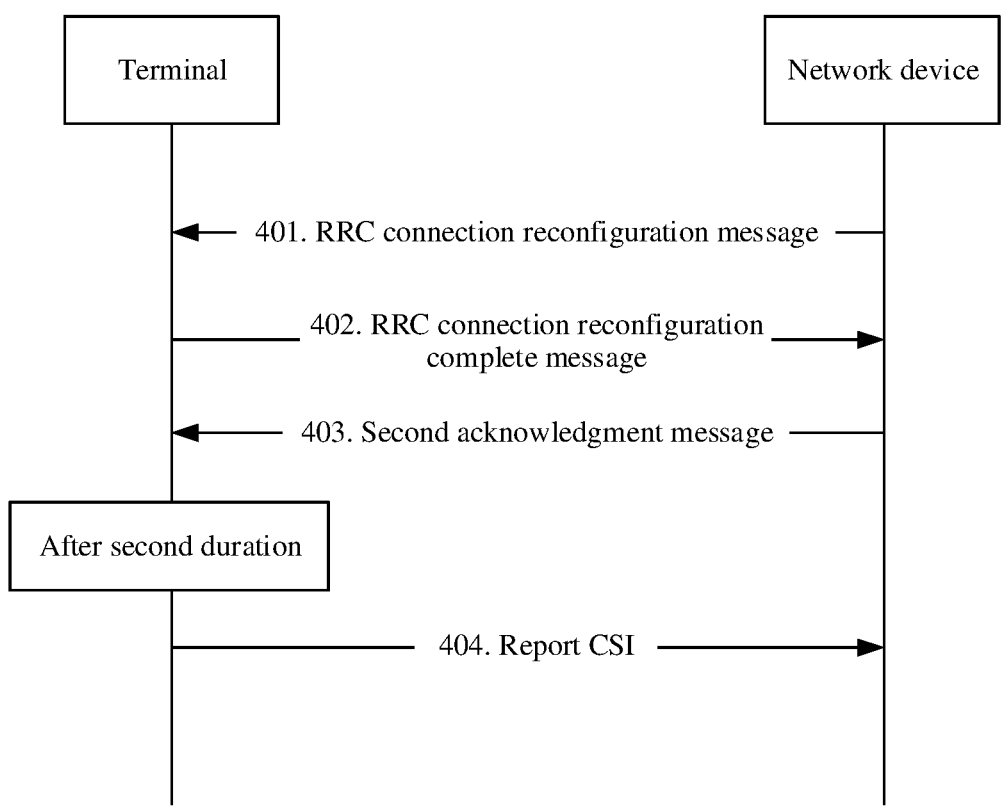
FIG. 4 is a schematic flowchart of a third communication method according to an embodiment of this application.

Based on the architecture of the communications system shown in FIG. 1, as shown in FIG. 4, the following describes in detail a third communication method according to an embodiment of this application.

Step 401. A network device sends an RRC connection reconfiguration message to a terminal, and the terminal receives the RRC connection reconfiguration message sent by the network device.

The RRC connection reconfiguration message includes one or more secondary cells configured by the network device for the terminal, and information used to indicate to activate the one or more secondary cells. Optionally, the RRC connection reconfiguration message herein may be another type of RRC signaling that carries the foregoing several types of information.

Step 402. The terminal sends an RRC connection reconfiguration complete message to the network device, and the network device receives the RRC connection reconfiguration complete message sent by the terminal.

Step 403. The network device sends a second acknowledgment message to the terminal, and the terminal receives the second acknowledgment message sent by the network device, where the second acknowledgment message is used to represent that the network device successfully receives the RRC connection reconfiguration complete message.

Step 404. After receiving the second acknowledgment message, the terminal reports CSI of the secondary cell after second duration, and after sending the second acknowledgment message, the network device receives, after the second duration, the CSI of the secondary cell that is reported by the terminal.

The second duration is pre-agreed on or notified by the network device, and the second duration may be one or more subframes.

The following specifically describes a manner in which the terminal receives the second acknowledgment message sent by the network device in step 403. After receiving the RRC connection reconfiguration complete message, the network device quickly feeds back the second acknowledgment message on an L1 resource or an L2 resource, and the terminal receives the second acknowledgment message fed back by the network device.

Manner a: The network device feeds back ACK information to the terminal on a physical HARQ indicator channel (PHICH) resource, where the ACK information is used to represent that the network device successfully receives the RRC connection reconfiguration complete message. The terminal receives the ACK information on a corresponding resource.

Manner b: The network device feeds back the second acknowledgment message on a resource that is occupied by a DMRS and that is in a physical downlink shared channel (PDSCH) resource, and the terminal receives the second acknowledgment message on the resource that is occupied by the DMRS and that is in the PDSCH resource.

Manner c: The network device sends a MAC CE on a downlink PDSCH resource, where the MAC CE is used to represent that the network device successfully receives the RRC connection reconfiguration complete message, and the terminal receives the MAC CE on the downlink resource.

After receiving the second acknowledgment message in any one of the manner a to the manner c, the terminal starts to report the CSI of the secondary cell after the second duration. For example, the second duration is 4 ms, that is, the second duration is four subframes. The terminal receives the second acknowledgment message at an $n^{th}$ moment, and starts to report the CSI of the secondary cell at an $(n+4)^{th}$ moment. A specific uplink resource used for reporting is determined based on a base station indication message.

The foregoing manner a to manner c show several possible manners in which the terminal receives the second acknowledgment message, and are merely examples for description. Certainly, the network device may alternatively quickly feed back the second message in another manner. In other words, the terminal may alternatively receive the second acknowledgment message in the another manner.

In another possible design in the third communication method, the behavior of reporting the CSI may be replaced with any one or more behaviors of activation complete operations performed by the terminal, to constitute another solution that needs to be protected in this application. The activation complete operations are some operations needing to be performed by the terminal after an activation operation performed on the secondary cell ends, to complete activation of the secondary cell. The network device can schedule the terminal only after the activation complete operations are performed. The activation complete operations include reporting the CSI. For example, the foregoing behavior of reporting the CSI is replaced with a behavior of listening to a PDCCH by the terminal.

In the third communication method provided in this embodiment of this application, the information used to indicate to activate the secondary cell is carried in the RRC connection reconfiguration message, so that an activation command used to activate the secondary cell is not needed, and configuration and activation notifications are included in one message. This helps reduce a delay in configuring and activating the secondary cell, improve utilization of a carrier aggregation technology, and further improve data transmission efficiency of a system. Because RRC signaling is higher layer signaling, and the network device cannot learn of a specific time at which the terminal receives the RRC connection reconfiguration message, the network device quickly feeds back an acknowledgment message after receiving the RRC connection reconfiguration complete message, to help implement time synchronization between the terminal and the network device in a process of activating the secondary cell. Before the start moment arrives, because the terminal does not report the CSI, the network device may not schedule the terminal, that is, may not send the PDCCH, and the terminal does not need to listen to the PDCCH. In this way, a waste of uplink PUCCH resources can be avoided, and energy overheads for listening to the PDCCH by the terminal can be reduced.

Figure 5A:
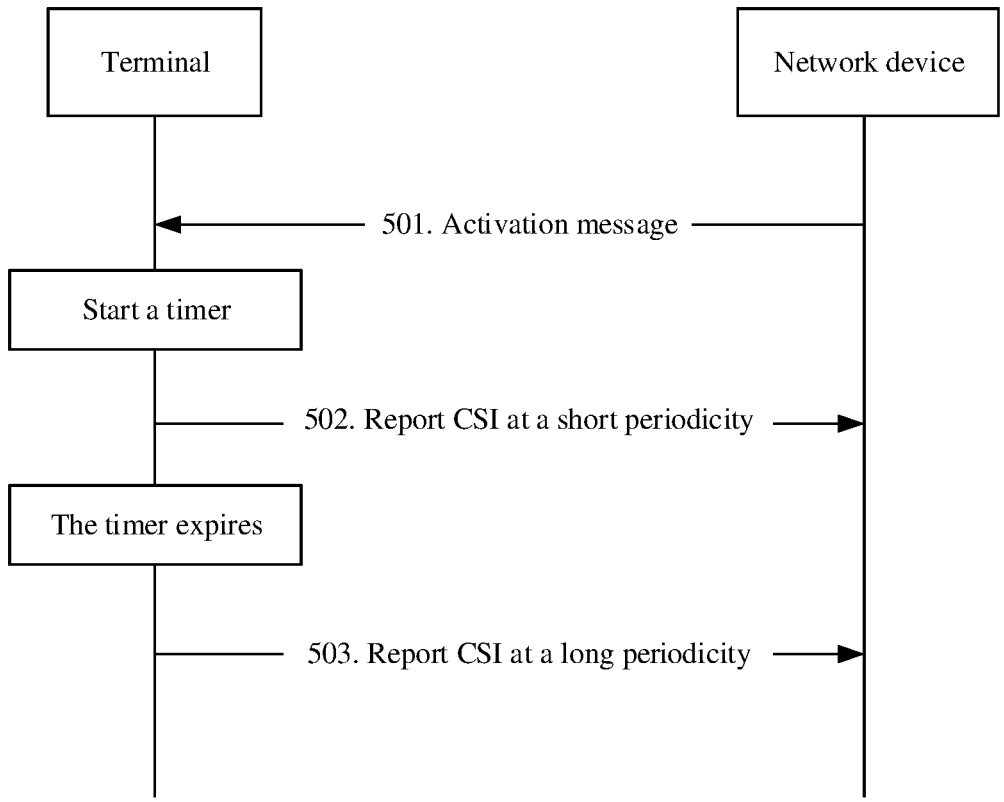
FIG. 5a is a schematic flowchart of a fourth communication method according to an embodiment of this application.

Based on the architecture of the communications system shown in FIG. 1, as shown in FIG. 5a, the following describes in detail a fourth communication method according to an embodiment of this application.

Step 501. A network device sends activation information to a terminal, and the terminal receives the activation information sent by the network device.

The activation information is used to indicate to activate one or more secondary cells configured by the network device for the terminal.

In a possible implementation, the activation information is an activation command in a conventional process of activating the secondary cell. Before receiving the activation command, the terminal further receives an RRC connection reconfiguration message sent by the network device, where the RRC connection reconfiguration message includes a secondary cell added or modified by the terminal based on a configuration from the network device, and an initial status of the secondary cell is a deactivated state. The network device sends the activation command to the terminal, where the activation command is used to activate the secondary cell.

In another possible implementation, the activation information is carried in the RRC connection reconfiguration message sent by the network device. In this manner, a step of sending the activation command is omitted.

Step 502. The terminal starts a timer based on the activation information, and periodically reports CSI of the secondary cell at a first periodicity.

Optionally, before step 502, the network device further possibly sends information such as duration of the timer, the first periodicity, or a second periodicity to the terminal. The terminal determines, based on the duration of the timer sent by the network device, whether the timer expires.

Step 503. The terminal periodically reports the CSI of the secondary cell at the second periodicity after the timer expires.

The CSI may be a CQI, or certainly may be another parameter. The first periodicity is less than the second periodicity.

In another possible design, after step 502, once the terminal receives any downlink control information (DCI) sent by the network device, for example, DCI that includes a downlink scheduling indication, the terminal stops the timer and periodically reports the CSI of the secondary cell at the second periodicity.

Figure 5B:
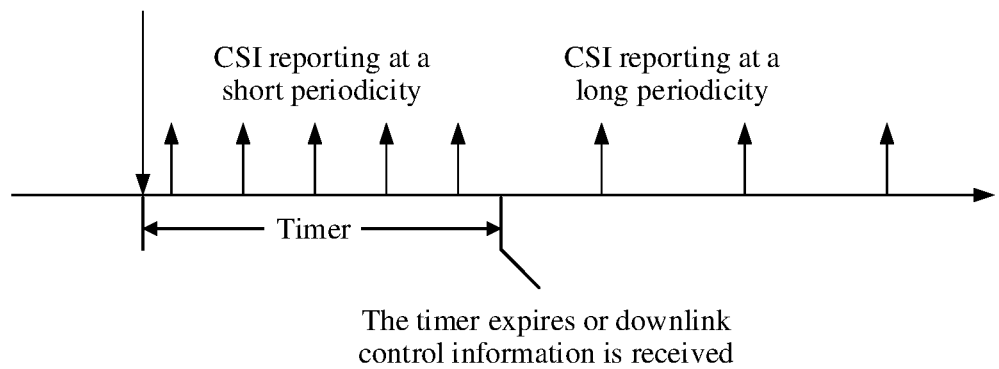
FIG. 5b is a first schematic diagram of periodically reporting CSI according to an embodiment of this application.

The following further describes, by using a schematic diagram shown in FIG. 5b, the fourth communication method provided in this embodiment of this application. As shown in FIG. 5b, after receiving the activation information, the terminal starts the timer, and periodically reports the CSI at the first periodicity (that is, reports the CSI at a short periodicity). After the timer expires, the terminal periodically reports the CSI at the second periodicity (that is, reports the CSI at a long periodicity). Both the first periodicity and the second periodicity are configured by a base station. Optionally, the base station may configure two sets of resources for periodic CSI reporting for the terminal, such as a first resource and a second resource, where a reporting periodicity in which the first resource is used is less than a reporting periodicity in which the second resource is used. The foregoing method for switching between the first periodicity and the second periodicity is also applicable to switching between the first resource and the second resource.

In the fourth communication method provided in this embodiment of this application, CSI reporting can be quickly performed at a relatively short periodicity, and compared with CSI reporting performed at a long periodicity, a network channel state can be quickly notified. This reduces a delay in scheduling the terminal by the network device. Therefore, the secondary cell is quickly applied to perform data transmission.

Figure 6A:
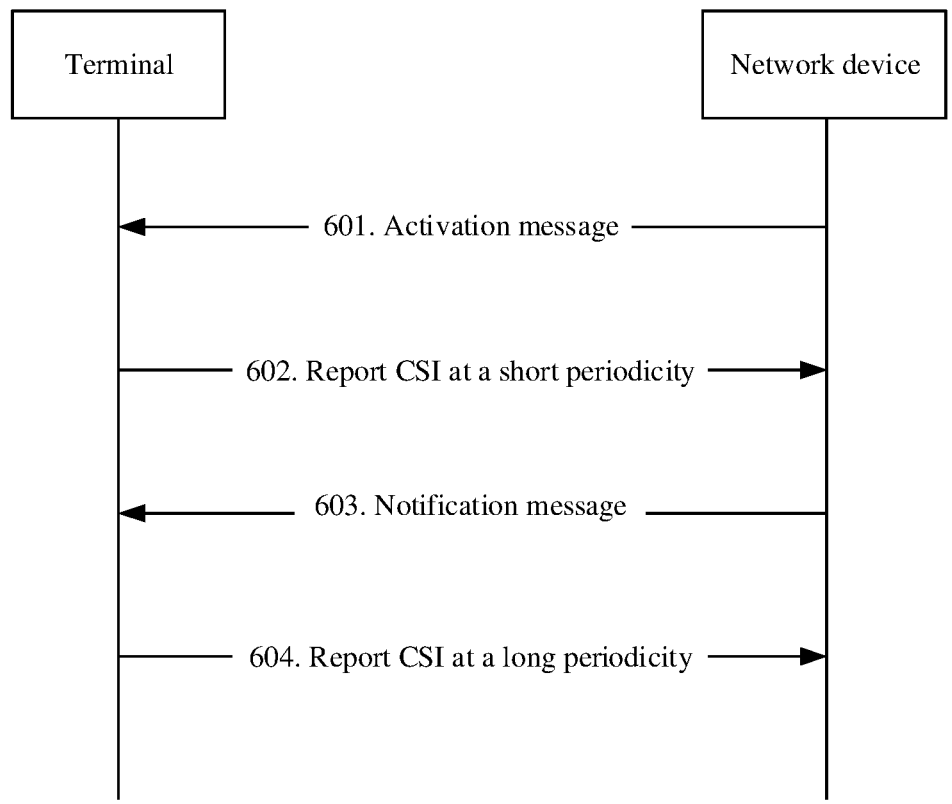
FIG. 6a is a schematic flowchart of a fifth communication method according to an embodiment of this application.

Based on the architecture of the communications system shown in FIG. 1, as shown in FIG. 6a, the following describes in detail a fifth communication method according to an embodiment of this application.

Step 601. A network device sends activation information to a terminal, and the terminal receives the activation information sent by the network device.

The activation information is used to indicate to activate one or more secondary cells configured by the network device for the terminal.

Step 602. The terminal periodically reports CSI of the secondary cell based on the activation information at a first periodicity.

Step 603. The network device sends notification information to the terminal, and the terminal receives the notification information sent by the network device.

The notification information may be an RRC message, a MAC CE, or a physical layer pilot signal.

Step 604. The terminal periodically reports the CSI of the secondary cell based on the notification information at a second periodicity.

The CSI may be a CQI, or certainly may be another parameter. The first periodicity is less than the second periodicity.

Figure 6B:
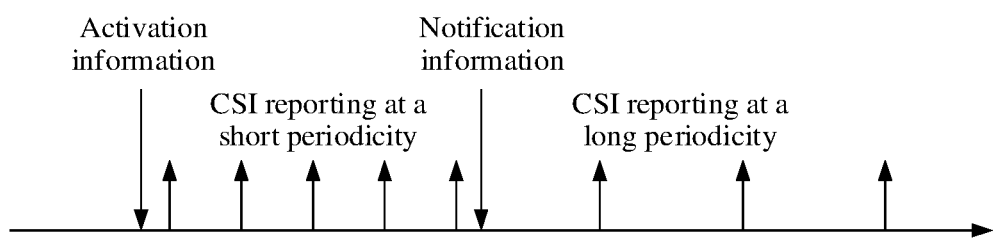
FIG. 6b is a second schematic diagram of periodically reporting CSI according to an embodiment of this application.

The following further describes, by using a schematic diagram shown in FIG. 6b, the fifth communication method provided in this embodiment of this application. As shown in FIG. 6b, after receiving the activation information, the terminal periodically reports the CSI at the first periodicity (that is, reports the CSI at a short periodicity). After receiving the notification information sent by the network device, the terminal periodically reports the CSI at the second periodicity (that is, reports the CSI at a long periodicity). Both the first periodicity and the second periodicity are configured by a base station. Optionally, the base station may configure two sets of resources for periodic CSI reporting for the terminal, such as a first resource and a second resource, where a reporting periodicity in which the first resource is used is less than a reporting periodicity in which the second resource is used. The foregoing method for switching between the first periodicity and the second periodicity is also applicable to switching between the first resource and the second resource.

In the fifth communication method provided in this embodiment of this application, CSI reporting can be quickly performed at a relatively short periodicity, and compared with CSI reporting performed at a long periodicity, a network channel state can be quickly notified. This reduces a delay in scheduling the terminal by the network device. Therefore, the secondary cell is quickly applied to perform data transmission.

Figure 7A:
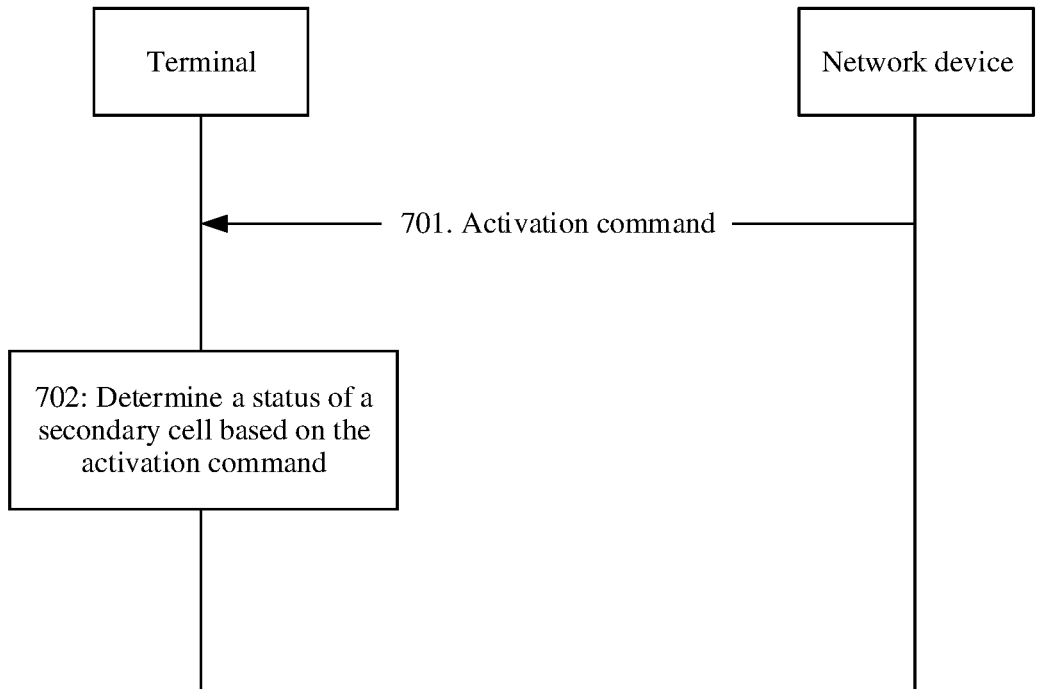
FIG. 7a is a schematic flowchart of a sixth communication method according to an embodiment of this application.

Based on the architecture of the communications system shown in FIG. 1, as shown in FIG. 7a, the following describes in detail a sixth communication method according to an embodiment of this application.

Step 701. A network device sends an activation command to a terminal, and the terminal receives the activation command sent by the network device.

Step 702: The terminal determines statuses of one or more secondary cells based on the activation command.

Optionally, after determining the statuses of the secondary cells, the terminal periodically reports CSI of a secondary cell in an activated state or a third state. In a possible implementation, the terminal starts a timer, and periodically reports the CSI of the secondary cell at a first periodicity. After the timer expires, the terminal periodically reports the CSI of the secondary cell at a second periodicity. The first periodicity is less than the second periodicity. Periodic reporting is first performed at the relatively short first periodicity. This helps the network device quickly perform data transmission scheduling on the terminal. In addition, switching between reporting at a short periodicity and reporting at a long periodicity is implemented based on the timer, so that signaling overheads can be reduced.

Specifically, the activation command is used to indicate a status of the secondary cell. The status of the secondary cell may include an activated state, a deactivated state, and a third state. The third state is a state different from the activated state and the deactivated state. The third state may also be referred to as a fast activated state or a pre-activated state. The third state may be considered as a special state of the deactivated state. When the secondary cell is in the third state, the terminal reports only the CSI periodically, and does not perform another operation when the secondary cell is in the activated state. The another operation is, for example, reporting only a CQI.

Figure 7B:
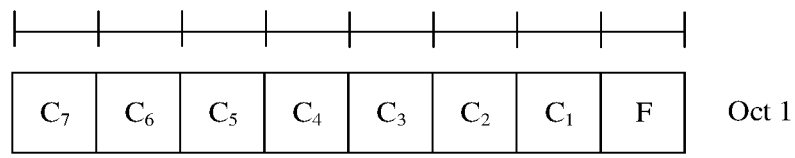
FIG. 7b is a first schematic diagram of a data format of an activation command according to an embodiment of this application.
Figure 7C:
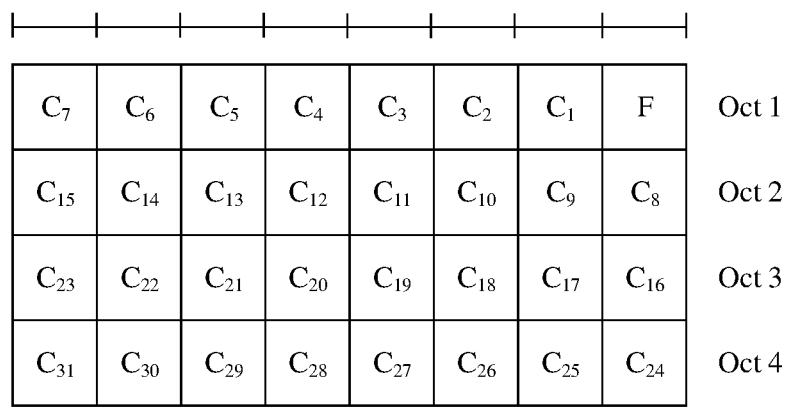
FIG. 7c is a second schematic diagram of a data format of an activation command according to an embodiment of this application.

The activation command may be a MAC CE. The activation command includes n first bits and one second bit. One or two first bits are used to indicate a status of one secondary cell. For example, as shown in FIG. 7b, the activation command has one byte, and n=7. In a data format of the activation command, the first seven bits are the first bits, and the last bit is the second bit. For another example, as shown in FIG. 7c, the activation command has four bytes, and n=31. In a data format of the activation command, in the first byte, the first seven bits are the first bits, and the eighth bit is the second bit; in the second byte to the fourth byte, each bit is the first bit.

The following specifically describes several manners of indicating the status of the secondary cell.

Manner 1: One first bit is used to indicate a status of one secondary cell, and when a value of the second bit is a first value, the first bit is used to indicate that the status of the secondary cell corresponding to the first bit is an activated state or a deactivated state; when a value of the second bit is a second value, the first bit is used to indicate whether the status of the secondary cell is a fast activated state. In this manner, the value of the second bit may alternatively be used to indicate whether to activate the third state.

For example, the first value is 0, and the second value is 1. When the value of the second bit is 0, the status of the secondary cell indicated by the first bit is the activated state or the deactivated state. Optionally, when the first bit is 1, it indicates that the status of the secondary cell is the activated state; when the first bit is 0, it indicates that the status of the secondary cell is the deactivated state. When the value of the second bit is 1, it represents that the third state is to be activated. Optionally, when the first bit is 1, it indicates that the status of the secondary cell is the third state; when the first bit is 0, it indicates that the secondary cell does not enter the third state.

As shown in FIG. 7b, the first seven bits are respectively used to indicate statues of secondary cells $C_7, C_6, \ldots,$ and $C_1$, and a bit F is used to indicate whether to activate the third state. When the bit F is 0, a value 1 of $C_X$ is used to indicate that the secondary cell $C_X$ is in the activated state; a value 0 of $C_X$ is used to indicate that the secondary cell $C_X$ is in the deactivated state. When the bit F is 1, it represents that the third state is to be activated. A value 1 of $C_X$ is used to indicate that the secondary cell $C_X$ is in the third state; a value 0 of $C_X$ is used to indicate that the secondary cell $C_X$ does not enter the third state. X is an index number of the secondary cell, and X=1, 2, . . . , and 7.

As shown in FIG. 7c, four bytes are used to indicate statuses of 31 secondary cells. The first seven bits in the first byte are respectively used to indicate statues of secondary cells $C_7, C_6, \ldots,$ and $C_1$, and a bit F is used to indicate whether to activate the third state. Bits in the second byte to the fourth byte are respectively used to indicate statuses of secondary cells $C_8$ to $C_{31}$. When the bit F is 0, a value 1 of $C_X$ is used to indicate that the secondary cell $C_X$ is in the activated state; a value 0 of $C_X$ is used to indicate that the secondary cell $C_X$ is in the deactivated state. When the bit F is 1, it represents that the third state is to be activated. A value 1 of $C_X$ is used to indicate that the secondary cell $C_X$ is in the third state; a value 0 of $C_X$ is used to indicate that the secondary cell $C_X$ does not enter the third state. X is an index number of the secondary cell, and X=1, 2, . . . , and 31.

Manner 2: One first bit is used to indicate a status of one secondary cell, and when a value of the second bit is a first value, the first bit is used to indicate that the status of the secondary cell corresponding to the first bit is an activated state or a non-activated state; when a value of the second bit is a second value, the first bit is used to indicate that the status of the secondary cell corresponding to the first bit is an activated state or a third state. In this manner, the value of the second bit may alternatively be used to indicate whether to activate the third state.

For example, the first value is 0, and the second value is 1. When the value of the second bit is 0, the status of the secondary cell indicated by the first bit is the activated state or the deactivated state. Optionally, when the first bit is 1, it indicates that the status of the secondary cell is the activated state; when the first bit is 0, it indicates that the status of the secondary cell is the deactivated state. When the value of the second bit is 1, it represents that the third state is to be activated. Optionally, when the first bit is 1, it indicates that the status of the secondary cell is the third state; when the first bit is 0, it indicates that the status of the secondary cell is the activated state.

As shown in FIG. 7b, the first seven bits are respectively used to indicate statues of secondary cells $C_7, C_6, \ldots,$ and $C_1$, and a bit F is used to indicate whether to activate the third state. When the bit F is 0, a value 1 of $C_X$ is used to indicate that the secondary cell $C_X$ is in the activated state; a value 0 of $C_X$ is used to indicate that the secondary cell $C_X$ is in the deactivated state. When the bit F is 1, it represents that the third state is to be activated. A value 1 of $C_X$ is used to indicate that the secondary cell $C_X$ is in the third state, and a value 0 of $C_X$ is used to indicate that the secondary cell $C_X$ is in the activated state. X is an index number of the secondary cell, and X=1, 2, . . . , and 7.

As shown in FIG. 7c, four bytes are used to indicate statuses of 31 secondary cells. The first seven bits in the first byte are respectively used to indicate statuses of secondary cells $C_7$, $C_6$, ..., and $C_1$, and a bit F is used to indicate whether to activate the third state. Bits in the second byte to the fourth byte are respectively used to indicate statuses of secondary cells $C_8$ to $C_{31}$. When the bit F is 0, a value 1 of $C_X$ is used to indicate that the secondary cell $C_X$ is in the activated state; a value 0 of $C_X$ is used to indicate that the secondary cell $C_X$ is in the deactivated state. When the bit F is 1, it represents that the third state is to be activated. A value 1 of $C_X$ is used to indicate that the secondary cell $C_X$ is in the third state, and a value 0 of $C_X$ is used to indicate that the secondary cell $C_X$ is in the activated state. X is an index number of the secondary cell, and X=1, 2, ..., and 31.

Manner 3: When the value of the second bit is the first value, one first bit is used to indicate a status of one secondary cell, and the first bit is used to indicate that the status of the secondary cell corresponding to the first bit is an activated state or an deactivated state; when the value of the second bit is the second value, two first bits are used to indicate a status of one secondary cell, and every two first bits are used to indicate that a status of a secondary cell corresponding to the two first bits is an activated state, a deactivated state, or a fast activated state. In this manner, the value of the second bit may alternatively be used to indicate whether the activation command is to be extended. When the value of the second bit is the first value, it represents that the activation command is not to be extended; when the value of the second bit is the second value, it represents that the activation command is to be extended by one or more bytes.

For example, the first value is 0, and the second value is 1. When the value of the second bit is 0, it represents that the activation command is not to be extended, and the status of the secondary cell indicated by the first bit is the activated state or the deactivated state. Optionally, when the first bit is 1, it indicates that the status of the secondary cell is the activated state; when the first bit is 0, it indicates that the status of the secondary cell is the deactivated state. When the value of the second bit is 1, it represents that the activation command is to be extended, and two first bits are used to indicate the status of the secondary cell. The two bits may represent a maximum of four states, and any three indication manners are selected to indicate three states. For example, 00 indicates the activated state, 10 indicates the deactivated state, and 01 indicates the third state.

As shown in FIG. 7d, in the first byte, the first seven bits are the first bits, and the last bit E is the second bit; in the second byte, the first seven bits are the first bits, and the last bit is a reserved bit R. When a value of the bit E is 0, it represents that the activation command is not to be extended, and a value 1 of $C_{X,0}$ is used to indicate that the secondary cell $C_{X,0}$ is in an activated state; a value 0 of $C_{X,0}$ is used to indicate that the secondary cell $C_{X,0}$ is in a deactivated state. When a value of the bit E is 1, it represents that the activation command is to be extended by one byte. In the to-be-extended byte, the first seven bits are the first bits, and the last bit R is a reserved bit. The two bits $C_{X,0}$ and $C_{X,1}$ are used to indicate a status of the secondary cell $C_X$. X is an index number of the secondary cell, and X=1, 2, ..., and 7. For example, 00 indicates the activated state, 10 indicates the deactivated state, and 01 indicates the third state.

As shown in FIG. 7e, four bytes are used to indicate statuses of 31 secondary cells. The first seven bits in the first byte are respectively used to indicate statues of secondary cells $C_7$, $C_6$, ..., and $C_1$, and a bit E' is used to indicate whether the activation command is to be extended by a byte. Bits in the second byte to the fourth byte are respectively used to indicate statuses of secondary cells $C_8$ to $C_{31}$. When a value of the bit E' is 0, it represents that the activation command is not to be extended, and a value 1 of $C_{X,0}$ is used to indicate that the secondary cell $C_{X,0}$ is in an activated state; a value 0 of $C_{X,0}$ is used to indicate that the secondary cell $C_{X,0}$ is in a deactivated state. When a value of the bit R is 1, it represents that the activation command is to be extended by four bytes. In the first byte of the to-be-extended bytes, the first seven bits are respectively used to indicate statuses of secondary cells $C_7$, $C_6$, ..., and $C_1$, and the last bit is a reserved bit R', where a function of the reserved bit R' in the to-be-extended bytes is not limited in this application. Bits in the second byte to the fourth byte of the to-be-extended bytes are respectively used to indicate statuses of secondary cells $C_8$ to $C_{31}$. The two bits $C_{X,0}$ and $C_{X,1}$ are used to indicate a status of the secondary cell $C_X$. X is an index number of the secondary cell, and X=1, 2, ..., and 31. For example, 00 indicates the activated state, 10 indicates the deactivated state, and 01 indicates the third state.

In FIG. 7b to FIG. 7e, Oct 1 to Oct 4 respectively represent the first byte to the fourth byte.

In the fifth communication method provided in this embodiment of this application, a data format of the activation command is designed, so that the activation command can indicate three or more states of the secondary cell. This improves application performance of a carrier aggregation technology, and further improves data transmission efficiency of a system.

At this point, description of the first communication method to the sixth communication method provided in this application is completed. It should be noted that the first communication method to the sixth communication method provided in the foregoing embodiments may be combined to constitute a solution that needs to be protected in this application. For example, the CSI reporting method provided in the fourth communication method or the fifth communication method may be used, to perform CSI reporting in the steps of the first communication method to the third communication method. In any communication method in the first communication method to the fifth communication method, the terminal may receive an activation command sent by the network device. A data format of the activation command is designed in the sixth communication method.

Figure 8:
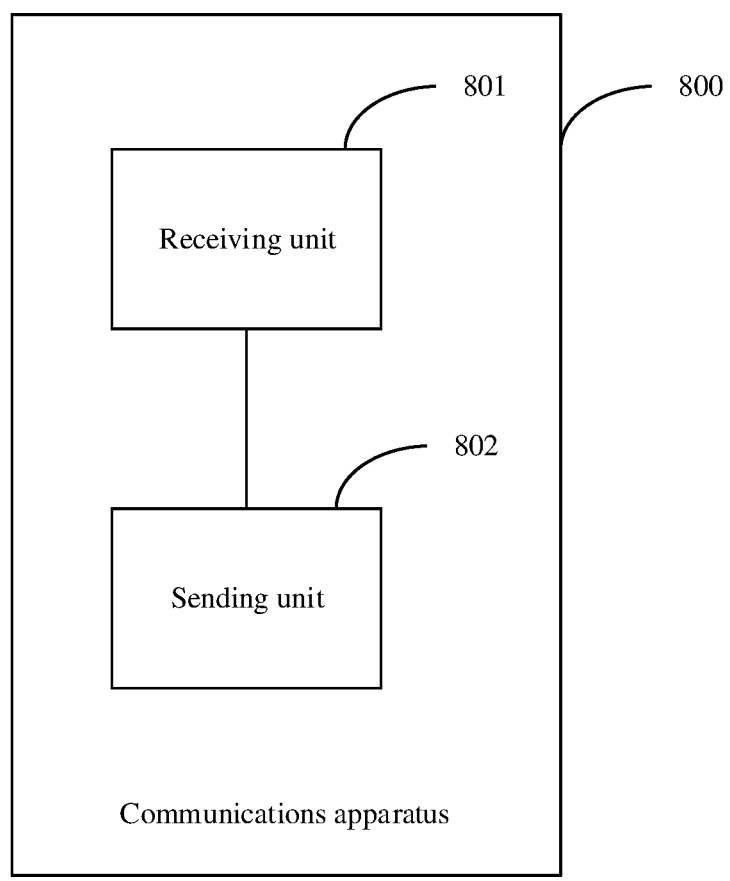
FIG. 8 is a first schematic structural diagram of a communications apparatus according to an embodiment of this application.

Based on a same inventive concept as that of the first communication method, as shown in FIG. 8, an embodiment of this application further provides a communications apparatus 800. The communications apparatus 800 is configured to implement the operations performed by the terminal in the first communication method provided in the foregoing embodiments. The communications apparatus 800 includes: a receiving unit 801, configured to receive an RRC connection reconfiguration message sent by a network device, where the RRC connection reconfiguration message includes one or more secondary cells configured by the network device for the terminal, information used to indicate to activate the one or more secondary cells, and a start moment at which the terminal reports CSI; and a sending unit 802, configured to report the CSI of the secondary cell when the start moment arrives.

The receiving unit 801 and the sending unit 802 in the communications apparatus 800 may further implement other operations or functions performed by the terminal in the first communication method provided in the foregoing embodiments, and repeated parts are not described again.

Based on a same inventive concept as that of the second communication method, the communications apparatus 800 may be further configured to implement the operations performed by the terminal in the second communication method provided in the foregoing embodiments. Details are as follows.

The receiving unit 801 is configured to receive an RRC connection reconfiguration message sent by a network device, where the RRC connection reconfiguration message includes one or more secondary cells configured by the network device for the terminal, and information used to indicate to activate the one or more secondary cells.

The sending unit 802 is configured to send a first acknowledgment message to the network device.

The sending unit 802 is further configured to: after sending the first acknowledgment message, report CSI of the secondary cell after first duration.

The receiving unit 801 and the sending unit 802 in the communications apparatus 800 may further implement other operations or functions performed by the terminal in the second communication method provided in the foregoing embodiments, and repeated parts are not described again.

Based on a same inventive concept as that of the third communication method, the communications apparatus 800 is configured to implement the operations performed by the terminal in the third communication method provided in the foregoing embodiments. Details are as follows.

The receiving unit 801 is configured to receive an RRC connection reconfiguration message sent by a network device, where the RRC connection reconfiguration message includes one or more secondary cells configured by the network device for the terminal, and information used to indicate to activate the one or more secondary cells.

The sending unit 802 is configured to send an RRC connection reconfiguration complete message sent by the network device.

The receiving unit 801 is further configured to receive a second acknowledgment message sent by the network device, where the second acknowledgment message is used to represent that the network device successfully receives the RRC connection reconfiguration complete message.

The sending unit 802 is further configured to: after receiving the second acknowledgment message, report CSI of the secondary cell after second duration.

The receiving unit 801 and the sending unit 802 in the communications apparatus 800 may further implement other operations or functions performed by the terminal in the third communication method provided in the foregoing embodiments, and repeated parts are not described again.

Based on a same inventive concept as that of the fourth communication method, the communications apparatus 800 is configured to implement the operations performed by the terminal in the fourth communication method provided in the foregoing embodiments. Details are as follows.

The receiving unit 801 is configured to receive activation information sent by a network device, where the activation information is used to indicate to activate one or more secondary cells configured by the network device for the terminal.

The sending unit 802 is configured to: start a timer based on the activation information, and periodically report CSI of the secondary cell at a first periodicity.

The sending unit 802 is further configured to periodically report the CSI of the secondary cell at a second periodicity after the timer expires.

The receiving unit 801 and the sending unit 802 in the communications apparatus 800 may further implement other operations or functions performed by the terminal in the fourth communication method provided in the foregoing embodiments, and repeated parts are not described again.

Based on a same inventive concept as that of the fifth communication method, the communications apparatus 800 is configured to implement the operations performed by the terminal in the fifth communication method provided in the foregoing embodiments. The communications apparatus 800 includes: the receiving unit 801, configured to receive activation information sent by a network device; and the sending unit 802, configured to periodically report CSI of the secondary cell based on the activation information at a first periodicity, where the receiving unit 801 is further configured to receive notification information sent by the network device; and the sending unit 802 is further configured to periodically report the CSI of the secondary cell based on the notification information at a second periodicity.

The receiving unit 801 and the sending unit 802 in the communications apparatus 800 may further implement other operations or functions performed by the terminal in the fifth communication method provided in the foregoing embodiments, and repeated parts are not described again.

Figure 9:
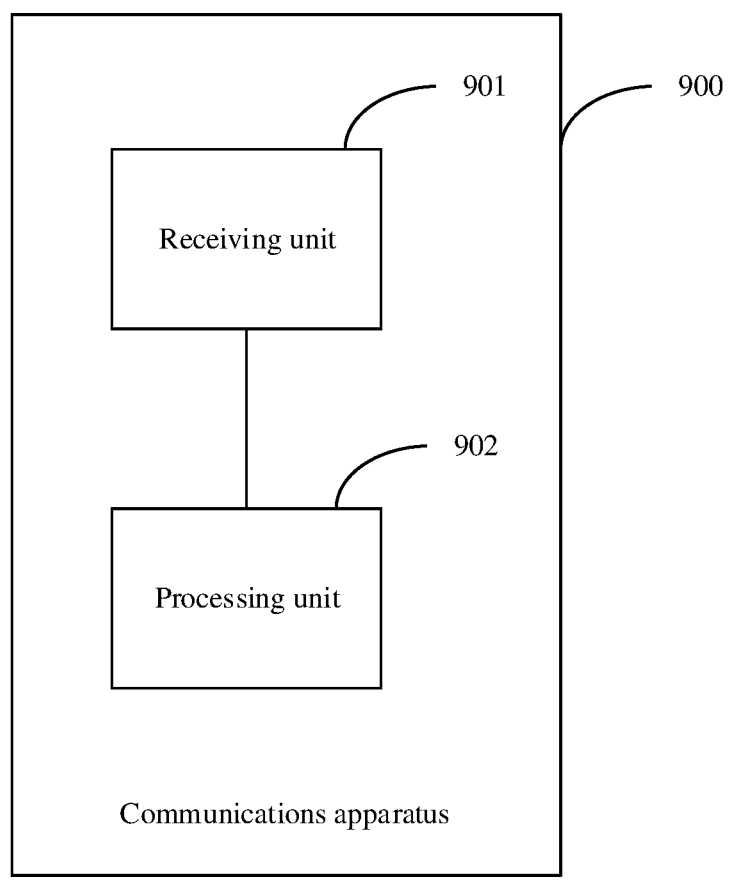
FIG. 9 is a second schematic structural diagram of a communications apparatus according to an embodiment of this application.

Based on a same inventive concept as that of the sixth communication method, as shown in FIG. 9, an embodiment of this application further provides a communications apparatus 900. The communications apparatus 900 is configured to implement the operations performed by the terminal in the sixth communication method provided in the foregoing embodiments. The communications apparatus 1300 includes: a receiving unit 901, configured to receive an activation command sent by a network device; and a processing unit 902, configured to determine statuses of one or more secondary cells based on the activation command.

A design of the activation command is described in the sixth communication method provided in the foregoing embodiments, and details are not described herein again.

Figure 10:
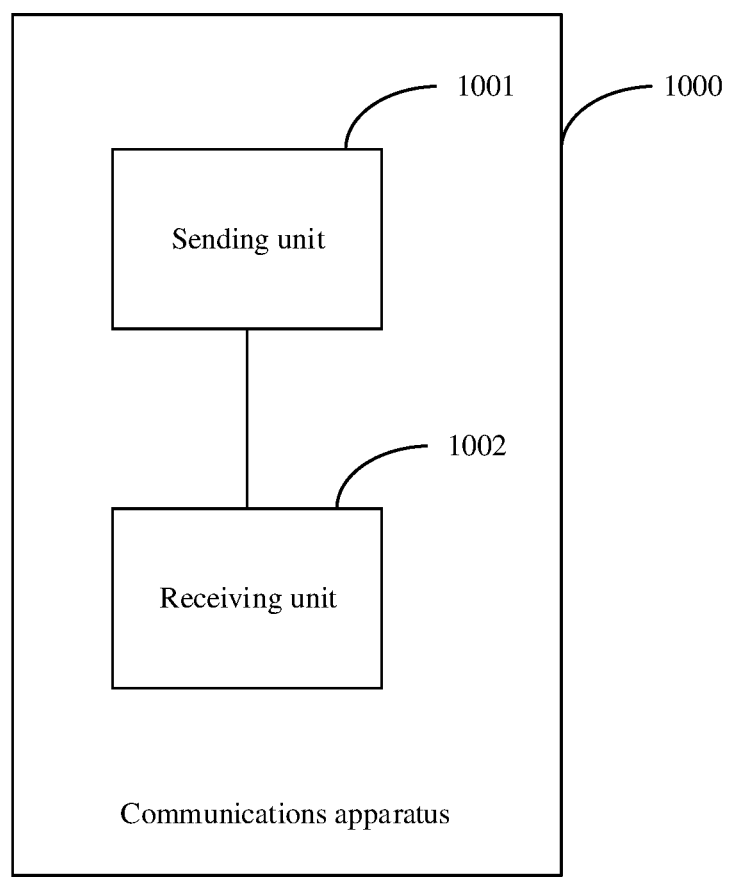
FIG. 10 is a third schematic structural diagram of a communications apparatus according to an embodiment of this application.

Based on a same inventive concept as that of the first communication method, as shown in FIG. 10, an embodiment of this application further provides a communications apparatus 1000. The communications apparatus 1000 is configured to implement the operations performed by the network device in the first communication method provided in the foregoing embodiments. The communications apparatus 1000 includes: a sending unit 1001, configured to send an RRC connection reconfiguration message to a terminal, where the RRC connection reconfiguration message includes one or more secondary cells configured by the network device for the terminal, information used to indicate to activate the one or more secondary cells, and a start moment at which the terminal reports CSI; and a receiving unit 1002, configured to receive the CSI of the secondary cell that is reported by the terminal.

The sending unit 1001 and the receiving unit 1002 in the communications apparatus 1000 may further implement other operations or functions performed by the network device in the first communication method provided in the foregoing embodiments, and repeated parts are not described again.

Based on a same inventive concept as that of the second communication method, the communications apparatus 1000 may be further configured to implement the operations performed by the network device in the first communication method provided in the foregoing embodiments. Details are as follows.

The sending unit 1001 is configured to send an RRC connection reconfiguration message to a terminal.

The receiving unit 1002 is configured to receive a first acknowledgment message, where the first acknowledgment message is an acknowledgment message that is quickly fed back for the RRC connection reconfiguration message, and is used to indicate that the RRC connection reconfiguration message is successfully received, or used to indicate that the secondary cell is successfully configured to the network device, or used to indicate that the secondary cell is successfully activated to the network device.

The receiving unit 1002 is further configured to: after receiving the first acknowledgment message, receive, after first duration, CSI reported by the terminal.

The sending unit 1001 and the receiving unit 1002 in the communications apparatus 1000 may further implement other operations or functions performed by the network device in the second communication method provided in the foregoing embodiments, and repeated parts are not described again.

Based on a same inventive concept as that of the third communication method, the communications apparatus 1000 may be further configured to implement the operations performed by the network device in the third communication method provided in the foregoing embodiments. Details are as follows.

The sending unit 1001 is configured to send an RRC connection reconfiguration message to a terminal, where the RRC connection reconfiguration message includes one or more secondary cells configured by the network device for the terminal, and information used to indicate to activate the one or more secondary cells.

The receiving unit 1002 is configured to receive an RRC connection reconfiguration complete message sent by the terminal.

The sending unit 1001 is further configured to send a second acknowledgment message to the terminal, where the second acknowledgment message is used to represent that the network device successfully receives the RRC connection reconfiguration complete message.

The receiving unit 1002 is further configured to: after the sending unit 1001 sends the second acknowledgment message, receive, after second duration, CSI reported by the terminal.

The sending unit 1001 and the receiving unit 1002 in the communications apparatus 1000 may further implement other operations or functions performed by the network device in the third communication method provided in the foregoing embodiments, and repeated parts are not described again.

Based on a same inventive concept as that of the fifth communication method, the communications apparatus 1000 may be further configured to implement the operations performed by the network device in the fifth communication method provided in the foregoing embodiments. Details are as follows.

The sending unit 1001 is configured to send activation information to a terminal, where the activation information is used to indicate to activate one or more secondary cells configured by the network device for a terminal.

The receiving unit 1002 is configured to receive CSI of the secondary cell that is sent by the terminal at a first periodicity.

The sending unit 1001 is further configured to send notification information to the terminal, where the notification information is used to notify the terminal that a length of a periodicity at which the CSI is periodically reported is switched from the first periodicity to a second periodicity.

The receiving unit 1002 is further configured to receive the CSI of the secondary cell that is sent by the terminal at the second periodicity.

The sending unit 1001 and the receiving unit 1002 in the communications apparatus 1000 may further implement other operations or functions performed by the network device in the fifth communication method provided in the foregoing embodiments, and repeated parts are not described again.

Figure 11:
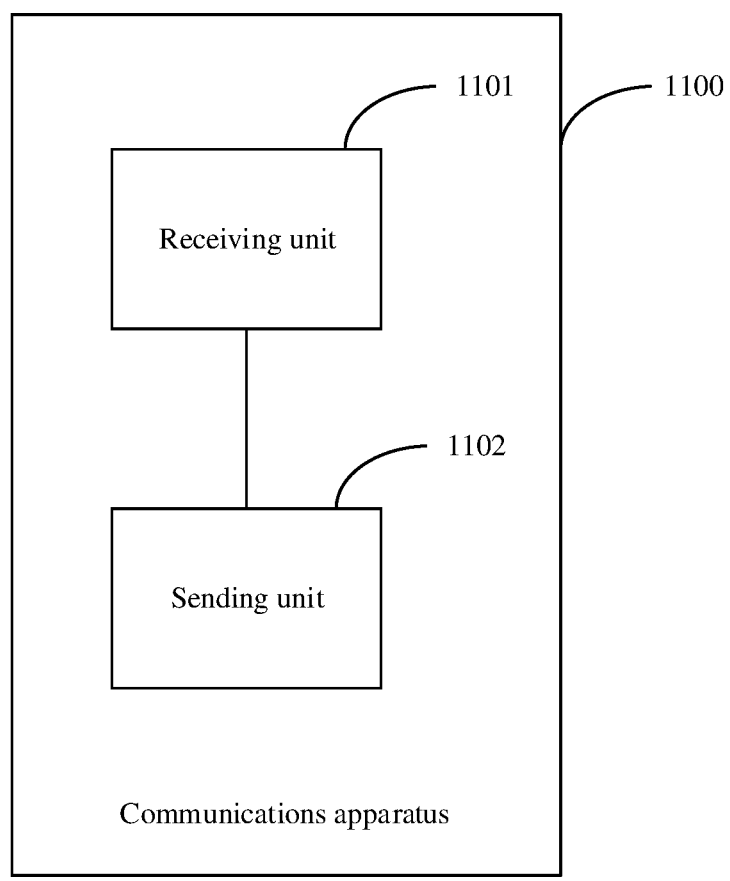
FIG. 11 is a fourth schematic structural diagram of a communications apparatus according to an embodiment of this application.

Based on a same inventive concept as that of the sixth communication method, as shown in FIG. 11, an embodiment of this application further provides a communications apparatus 1100. The communications apparatus 1100 is configured to implement the operations performed by the network device in the sixth communication method provided in the foregoing embodiments. The communications apparatus 1100 includes: a processing unit 1101, configured to generate an activation command; and a sending unit 1102, configured to send the activation command to a terminal.

A design of the activation command is described in the sixth communication method provided in the foregoing embodiments, and details are not described herein again.

The communications apparatuses shown in FIG. 8 to FIG. 11 and the first communication method to the sixth communication method are based on a same inventive concept. Because problem resolving principles of the method and the apparatus are similar, for implementation of the apparatus and the method, refer to each other, and repeated parts are not described again.

Figure 12:
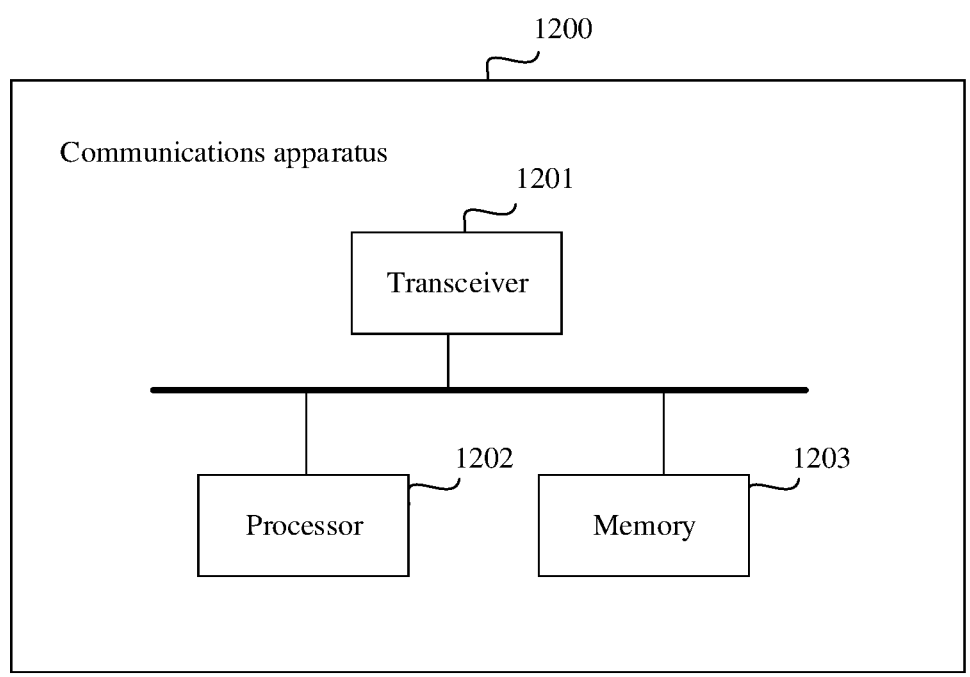
FIG. 12 is a fifth schematic structural diagram of a communications apparatus according to an embodiment of this application.

Based on a same inventive concept as that of the foregoing method embodiments, as shown in FIG. 12, an embodiment of this application further provides a communications apparatus 1200. The communications apparatus 1200 is configured to implement the operations performed by the terminal or the network device in any one of the first communication method to the sixth communication method provided in the foregoing embodiments. The communications apparatus 1200 includes a transceiver 1201, a processor 1202, and a memory 1203. The processor 1202 is configured to invoke a group of programs, and when the programs are executed, the processor 1202 is enabled to perform the operations performed by the terminal in any one of the first communication method to the sixth communication method provided in the foregoing embodiments. The memory 1203 is configured to store the programs executed by the processor 1202. The processing units of the function modules in FIG. 8 to FIG. 11 may be implemented by using the processor 1202, and the receiving units or the sending units of the function modules may be implemented by using the transceiver 1201.

The processor 1202 may be a central processing unit (CPU), a network processor (NP), or a combination of the CPU and the NP.

The processor 1202 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory 1203 may include a volatile memory, for example, a random access memory (RAM). The memory 1203 may alternatively include a non-volatile memory, for example, a flash memory, a hard disk (HDD), or a solid-state drive (SSD). The memory 1203 may alternatively include a combination of the foregoing types of memories.

In the first communication method to the sixth communication method provided in the foregoing embodiments of this application, some or all of the described operations and functions performed by the terminal may be completed by using a chip or an integrated circuit, and some or all of the described operations and functions performed by the network device may also be implemented by using a chip or an integrated circuit.

To implement the functions of the apparatuses in FIG. 8 to FIG. 12, an embodiment of this application further provides a chip, including a processor, and configured to support the apparatuses in implementing the functions related to the terminal or the network device in any one of the first communication method to the sixth communication method. In a possible design, the chip is connected to a memory or the chip includes the memory, and the memory is configured to store a program instruction and data that are necessary to the apparatus.

An embodiment of this application provides a computer-readable storage medium storing a computer program, and the computer program includes an instruction configured to perform any one of the first communication method to the sixth communication method.

An embodiment of this application provides a computer program product including an instruction. When the computer program product runs on a computer, the computer is enabled to perform any one of the first communication method to the sixth communication method.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device, and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method, comprising:
receiving, by a terminal device, a radio resource control (RRC) connection reconfiguration message sent by a network device, wherein the RRC connection reconfiguration message comprises an identification of one or more secondary cells configured by the network device for the terminal device, information indicating to activate the one or more secondary cells, and a start moment at which the terminal device will start to report channel state information (CSI) of the one or more secondary cells, wherein arrival of the start moment indicates a moment at which the terminal starts to listen to a physical downlink control channel (PDCCH); and
starting, by the terminal device, to report the CSI of the one or more secondary cells at the start moment.

2. The method according to claim 1, wherein the CSI comprises a channel quality indicator (CQI).

3. The method according to claim 1, wherein the CSI comprises a feedback precoding matrix indicator (PMI).

4. The method according to claim 1, wherein the CSI comprises a rank indication (RI).

5. The method according to claim 1, wherein the CSI comprises a precoding type indicator (PTI).

6. The method according to claim 1, wherein starting to report the CSI of the one or more secondary cells at the start moment comprises:
periodically reporting the CSI of the one or more secondary cells according to a first periodicity;
receiving notification information sent by the network device; and
periodically reporting the CSI of the one or more secondary cells based on the notification information according to a second periodicity, wherein the first periodicity is less than the second periodicity.

7. The method according to claim 1, wherein starting to report the CSI of the one or more secondary cells at the start moment comprises:
starting a timer at the start moment;
after starting the timer at the start moment, periodically reporting the CSI of the one or more secondary cells according to a first periodicity; and periodically reporting the CSI of the one or more secondary cells according to a second periodicity after the timer expires, wherein the first periodicity is less than the second periodicity.

8. A method, comprising:
sending, by a network device, a radio resource control (RRC) connection reconfiguration message to a terminal, wherein the RRC connection reconfiguration message comprises one or more secondary cells configured by the network device for the terminal, information indicating to activate the one or more secondary cells, and a start moment at which the terminal will start to report channel state information (CSI), wherein arrival of the start moment indicates a moment at which the terminal starts to listen to a physical downlink control channel (PDCCH); and
receiving, based on the start moment, the CSI of the one or more secondary cells that is reported by the terminal.

9. The method according to claim 8, wherein the CSI of the one or more secondary cells comprises:
a channel quality indicator (CQI);
a feedback precoding matrix indicator (PMI);
a rank indication (RI); or
a precoding type indicator (PTI).

10. The method according to claim 8, wherein receiving the CSI of the one or more secondary cells that is reported by the terminal comprises receiving the CSI of the one or more secondary cells that is periodically reported at a first periodicity from the terminal; and
wherein the method further comprises:
sending notification information to the terminal, wherein the notification information indicates to the terminal to periodically report the CSI of the one or more secondary cells at a second periodicity, wherein the first periodicity is less than the second periodicity.

11. The method according to claim 10, wherein the notification information comprises: a radio resource control (RRC) message.

12. The method according to claim 10, wherein the notification information comprises: a media access control layer control element (MAC CE).

13. The method according to claim 10, wherein the notification information comprises: a physical layer pilot signal.

14. An apparatus, comprising:
a processor; and
a non-transitory computer-readable storage medium storing a program to be executed by the processor, the program including instructions for:
receiving a radio resource control (RRC) connection reconfiguration message sent by a network device, wherein the RRC connection reconfiguration message comprises an identification of one or more secondary cells configured by the network device for a terminal device, information indicating to activate the one or more secondary cells, and a start moment at which the terminal device will start to report channel state information (CSI) of the one or more secondary cells, wherein arrival of the start moment indicates a moment at which the terminal starts to listen to a physical downlink control channel (PDCCH), wherein the start moment is indicated using a combination of a frame number and a subframe number; and
starting to report the CSI of the one or more secondary cells at the start moment.

15. The apparatus according to claim 14, wherein the CSI comprises a channel quality indicator (CQI).

16. The apparatus according to claim 14, wherein the CSI comprises a feedback precoding matrix indicator (PMI).

17. The apparatus according to claim 14, wherein the CSI comprises a rank indication (RI).

18. The apparatus according to claim 14, wherein the CSI comprises a precoding type indicator (PTI).

19. The apparatus according to claim 14, wherein starting to report the CSI of the one or more secondary cells at the start moment comprises:
periodically reporting the CSI of the one or more secondary cells according to a first periodicity;
receiving notification information sent by the network device; and
periodically reporting the CSI of the one or more secondary cells based on the notification information according to a second periodicity, wherein the first periodicity is less than the second periodicity.

20. The apparatus according to claim 14, wherein starting to report the CSI of the one or more secondary cells at the start moment comprises:
starting a timer at the start moment;
after starting the timer at the start moment, periodically reporting the CSI of the one or more secondary cells according to a first periodicity; and
periodically reporting the CSI of the one or more secondary cells according to a second periodicity after the timer expires, wherein the first periodicity is less than the second periodicity.

* * * * *